United States Patent
Fujiwara et al.

(10) Patent No.: US 7,551,247 B2
(45) Date of Patent: Jun. 23, 2009

(54) REFLECTION TYPE DISPLAY DEVICE AND METHOD WITH PIXEL ELECTRODES HAVING PREDETERMINED DIMENSIONS AND RELATIONSHIPS TO EACH OTHER AS TO GAP WIDTH THEREBETWEEN ON BOTH SHORT AND LONG SIDES AND PITCH OF CUBIC CORNER CUBES

(75) Inventors: Sayuri Fujiwara, Nara (JP); Yutaka Sawayama, Nabari (JP); Kiyoshi Minoura, Nara (JP); Makoto Kanbe, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 203 days.

(21) Appl. No.: 11/145,226

(22) Filed: Jun. 6, 2005

(65) Prior Publication Data
US 2005/0275773 A1 Dec. 15, 2005

(30) Foreign Application Priority Data
Jun. 9, 2004 (JP) ............... 2004-171530

(51) Int. Cl.
G02F 1/1335 (2006.01)

(52) U.S. Cl. ...................................... 349/113
(58) Field of Classification Search .............. 349/113, 349/114
See application file for complete search history.

(56) References Cited

U.S. PATENT DOCUMENTS 5,585,951 A 12/1996 Noda et al.
6,014,193 A * 1/2000 Taira et al. ..................... 349/73
6,020,599 A * 2/2000 Yeo ............................. 257/59
6,577,362 B1 * 6/2003 Moore ......................... 349/114
6,657,766 B2 * 12/2003 Minoura et al. ............. 359/263
6,671,019 B1 * 12/2003 Petschek et al. ............. 349/129
6,788,366 B2 9/2004 Sawayama et al.
6,819,507 B2 11/2004 Minoura et al.
6,879,359 B1 4/2005 Kikkawa et al.
2002/0001048 A1 * 1/2002 Lee et al. ..................... 349/43
2002/0176040 A1 * 11/2002 Lim et al. .................... 349/113
2003/0156240 A1 8/2003 Oda et al.
2003/0164915 A1 9/2003 Fujiwara et al.

FOREIGN PATENT DOCUMENTS

| JP | 8-152621 | 6/1996 |
| JP | 2000-206564 | 7/2000 |
| JP | 3166377 | 3/2001 |
| JP | 2002-139729 | 5/2002 |
| JP | 2003-84274 | 3/2003 |
| KR | 2003-0057207 A | 7/2003 |

* cited by examiner

Primary Examiner—David Nelms
Assistant Examiner—John Heyman
(74) Attorney, Agent, or Firm—Nixon & Vanderhye P.C.

(57) ABSTRACT

A reflection-type display device 200 includes: an active switch layer 201s including a plurality of switching elements 201t; a plurality of pixel electrodes 207 each connected to a corresponding one of the plurality of switching elements 201t; a reflective layer 205 formed between the active switch layer 201s and the plurality of pixel electrodes 207; and a modulation layer 213 provided at a side of the pixel electrodes 207 facing a viewer, the modulation layer 213 being capable of switching between a first state and a second state of respectively different optical characteristics. The reflective layer 205 is connected to neither the plurality of switching elements 201t nor the plurality of pixel electrodes 207.

13 Claims, 16 Drawing Sheets

REFLECTION TYPE DISPLAY DEVICE AND METHOD WITH PIXEL ELECTRODES HAVING PREDETERMINED DIMENSIONS AND RELATIONSHIPS TO EACH OTHER AS TO GAP WIDTH THEREBETWEEN ON BOTH SHORT AND LONG SIDES AND PITCH OF CUBIC CORNER CUBES

BACKGROUND OF THE INVENTION

1. Field of the Invention

The present invention relates to a reflection-type display device and a method for producing the same.

2. Description of the Related Art

Liquid crystal display device (hereinafter "LCDs") of a reflection type, which perform display by utilizing ambient light as a light source, have been known. Since reflection-type LCDs do not require a backlight as do transmission-type LCDs, reflection-type LCDs are suitably used for various devices which must have a light weight and a thin thickness. In particular, reflection-type LCDs of an active matrix driving type, in which a switching element is provided corresponding to each pixel, are capable of performing display with a high resolution and high quality.

In order to further improve the display performance of a reflection-type LCD, a retroreflection-type LCD which includes a retroreflection plate as a reflective layer for reflecting ambient light is proposed. As used herein, a "retroreflection plate" is an optical element which reflects an incoming ray of light with a plurality of reflection surfaces, regardless of the orientation of the ray, in the direction in which the ray entered the device. For example, a retroreflection plate is composed of a two-dimensional array of minute unit features.

Since retroreflection-type LCDs do not require any polarizing plates, there is no decrease in the efficiency of light utilization associated with the use of polarizing plates, and hence retroreflection-type LCDs can perform brighter display. Moreover, retroreflection-type LCDs are considered as promising because of their potential ability to realize an improved display contrast ratio.

Hereinafter, the structure of a retroreflection-type LCD of an active matrix driving type will be described with reference to the accompanying drawings. FIG. 1A is a schematic cross-sectional view showing a retroreflection-type LCD. FIG. 1B is a plan view showing reflection electrodes in the display device of FIG. 1A. A structure as shown in FIGS. 1A and 1B is disclosed in, for example, Japanese Laid-Open Patent Publication No. 2003-195788.

As shown in FIG. 1A, the retroreflection-type LCD comprises: a front substrate 110 on which color filters 119, a transparent counter electrode 111, and an alignment film 112 are provided; a rear substrate 109 provided so as to oppose the front substrate 110; and a liquid crystal layer 113 interposed between the substrates 110 and 109. The rear substrate 109 includes: a TFT substrate 101 having a plurality of switching elements (TFTs) formed thereon; an insulating layer 102 which is provided on the TFT substrate 101 and has a surface configuration that exhibits a retroreflection property; a plurality of reflection electrodes 105; and an alignment layer 118. The reflection electrodes 105, which are formed on the insulating layer 102, present an uneven surface corresponding to the surface configuration of the insulating layer 102. As shown in FIG. 1B, the reflection electrodes 105 are formed so as to be spaced apart from one another, corresponding to pixels (which define units of image displaying). Each reflection electrode 105 is connected to a drain electrode 103 of a corresponding switching element on the TFT substrate 101, via a contact hole 104 which is formed in the insulating layer 102. The alignment layer 118, which is formed above the insulating layer 102 and the reflection electrodes 105, has protrusions and depressions corresponding to the surface configuration of the insulating layer 102. The liquid crystal layer 113 may be composed of, for example, a scattering type liquid crystal material which is capable of switching between a light transmitting state and a light scattering state (forward scattering) in accordance with a varying voltage which is applied between the counter electrode 111 and each reflection electrode 105.

In a display device of this structure, the plurality of reflection electrodes 105 function as pixel electrodes and as a retroreflective layer. Hereinafter, the operation of this display device will be described.

While the liquid crystal layer 113 is controlled to be in a transmitting state, light from a light source which lies external to the display device or ambient light is transmitted through the front substrate 110 and the liquid crystal layer 113, and thereafter reflected by the reflection electrodes 105 in the direction in which the light has entered. From the display device under this condition, an image of the eye(s) of the viewer himself or herself is perceived by the viewer, whereby a "black" displaying state is obtained.

On the other hand, while the liquid crystal layer 113 is controlled to be in a scattering state, the light from a light source or ambient light which has been transmitted through the front substrate 110 is scattered in the liquid crystal layer 113. In the case where the liquid crystal layer 113 is a forward scattering-type liquid crystal layer, the scattered light is reflected by the reflective layer 105, further travels through the liquid crystal layer 113 (which is in a scattering state), and goes out in the viewing direction. Since the retroreflection property of the reflective layer 105 is counteracted by the scattering in the liquid crystal layer 113, the incident light does not go back in its incident direction. As a result, a "white" displaying state is obtained.

The retroreflection-type display device described above has the following problems.

Firstly, the reflection electrodes 105 of the shape as shown in FIG. 1B are typically formed by patterning a concavo-convex metal film. However, it is difficult to perform a highly precise patterning for a concavo-convex metal film. In particular, when a metal film having a complicated surface configuration, e.g., a metal film having a corner cube array structure, it is difficult to form the reflection electrodes 105 in the designed manner, because the metal film is likely to be etched with dependence on the size and/or array pattern of the corner cubes. Therefore, it is difficult to reduce the interspaces between adjoining reflection electrodes 105, and thus the aperture ratio is decreased. Furthermore, since any light entering the gaps between reflection electrodes 105 is not reflected, the efficiency of light utilization is lowered, too. In answer to this problem, the Applicant has proposed in Japanese Laid-Open Patent Publication No. 2003-195788, supra, to perform a patterning of the reflection electrodes 105 in a manner to match the array pattern of the corner cubes, thus to reduce the interspaces between adjoining reflection electrodes 10; however, as the size of each corner cube becomes more minuscule, it becomes more difficult to apply this technique. In addition, design freedom of the reflection electrodes 105 is limited.

Secondly, the protrusions and depressions on the surface profile of the alignment film 118 of the rear substrate 109 make it difficult to realize a stable alignment in the liquid crystal layer 113. In the case where there is a large difference in levels between the depressions and the protrusions on the surface of the alignment film 118, the consequent variations in the thickness of the liquid crystal layer 113 may affect the displaying characteristics.

Although a retroreflection-type LCD is exemplified above, those reflection-type LCDs whose reflective layer is a reflection plate having diffuse reflection characteristics also have reflection electrodes which function both as a reflective layer and pixel electrodes, similarly to the structure shown in FIG. 1; therefore, such reflection-type LCDs also have problems similar to those described above.

Such a diffuse reflection-type LCD structure is disclosed in Japanese Patent No. 3166377, for example. In the structure disclosed in Japanese Patent No. 3166377, an insulative film having a large refractive index is formed between a liquid crystal layer and reflection electrodes whose surfaces have protrusions and depressions. As a result, the protrusions and depressions of the reflection electrodes are to some extent planarized by the insulative film, whereby the aforementioned second problem can be improved. However, a voltage drop is caused by the insulative film which is formed between the liquid crystal layer and the reflection electrodes, and therefore a high driving voltage is required.

As described above, in conventional reflection-type LCDS, a metal film whose surface has protrusions and depressions must be patterned in such a manner as to form reflection electrodes which are spaced apart from one another pixel corresponding to the pixels. However, it is difficult to perform a highly precise patterning for such a metal film. Moreover, there is a problem in the case of performing a patterning utilizing protrusions and depressions, in that the design freedom of the reflection electrodes is limited. Thus, it is difficult to enhance the aperture ratio and/or efficiency of light utilization by reducing the interspaces between reflection electrodes. Furthermore, there is also a problem in that, since a liquid crystal layer is formed on a surface having protrusions and depressions, it is difficult to stably control the alignment in the liquid crystal layer.

SUMMARY OF THE INVENTION

In order to overcome the problems described above, preferred embodiments of the present invention provide a reflection-type LCD which realizes an improved aperture ratio and an improved efficiency of light utilization while maintaining a stable alignment in the liquid crystal.

A reflection-type display device according to the present invention comprises: an active switch layer including a plurality of switching elements; a plurality of pixel electrodes each connected to a corresponding one of the plurality of switching elements; a reflective layer formed between the active switch layer and the plurality of pixel electrodes; and a modulation layer provided at a side of the pixel electrodes facing a viewer, the modulation layer being capable of switching between a first state and a second state of respectively different optical characteristics, wherein the reflective layer is connected to neither the plurality of switching elements nor the plurality of pixel electrodes.

Preferably, the reflective layer is present below gaps between adjoining pixel electrodes.

Preferably, the reflective layer is not divided into portions corresponding to pixels.

In a preferred embodiment, the reflective layer has a plurality of openings, and each of the plurality of pixel electrodes is connected to the corresponding switching element via a corresponding one of the plurality of openings in the reflective layer.

In a preferred embodiment, the reflection-type display device further comprises a plurality of contact portions for respectively connecting the plurality of pixel electrodes with the corresponding switching elements, each of the plurality of contact portions being provided via a corresponding one of the plurality of openings in the reflective layer, wherein each contact portion has a diameter which is smaller than a diameter of each opening.

In a preferred embodiment, the reflective layer has retroreflection characteristics.

The reflective layer may include a two-dimensional array of a plurality of unit features, and the gaps between adjoining pixel electrodes may not be aligned with the unit features of the reflective layer.

The unit features of the reflective layer may be cubic corner cubes.

Preferably, each pixel electrode has a substantially rectangular planar shape, and the relationship $((\sqrt{3})/6 \times P_{pix(L)} \times P_{cc} + P_{pix(S)} \times P_{cc}/2)/(P_{pix(L)} \times P_{pix(S)}) > 0.005$ is satisfied, and more preferably the relationship $((\sqrt{3})/6 \times P_{pix(L)} \times P_{cc} + P_{pix(S)} \times P_{cc}/2)/(P_{pix(L)} \times P_{pix(S)}) > 0.01$ is satisfied, where $P_{pix(S)}$ is a pitch of the pixel electrodes along a direction of shorter sides thereof; $P_{pix(L)}$ is a pitch of the pixel electrodes along a direction of longer sides thereof; and $P_{cc}$ is a pitch of the cubic corner cubes.

Preferably, the relationship $((\sqrt{3})+3)/6 \times P_{cc}/P_{pix} > 0.005$ is satisfied, and more preferably the relationship $((\sqrt{3})+3)/6 \times P_{cc}/P_{pix} > 0.01$ is satisfied, where $P_{pix}$ is a pitch of the pixel electrodes; and $P_{cc}$ is a pitch of the corner cubes.

In a preferred embodiment, the modulation layer is capable of switching between a light scattering state and a light transmitting state.

A method for producing a reflection-type display device according to the present invention comprises the steps of: providing a substrate having an active switch layer formed thereon, the active switch layer including a plurality of switching elements; forming an insulating layer on the active switch layer; forming a reflective layer on the insulating layer, the reflective layer having a plurality of openings; forming a planarization resin layer on the reflective layer; forming a plurality of pixel electrodes on the planarization resin layer, each of the plurality of pixel electrodes being connected to a corresponding one of the plurality of switching elements; and providing a modulation layer on the plurality of pixel electrodes, the modulation layer being capable of switching between a first state and a second state of respectively different optical characteristics, wherein each of the plurality of pixel electrodes is connected to the corresponding switching element via a corresponding one of the plurality of openings in the reflective layer.

According to the present invention, a reflective layer is provided as a separate element from the pixel electrodes, and therefore it is unnecessary to split the reflective layer into portions which are spaced apart so as to correspond to the pixels. Therefore, the area of the reflective layer can be increased, whereby the efficiency of light utilization can be improved. Moreover, since the patterning of the pixel electrodes can be performed irrespectively of the configuration of the protrusions and depressions of the reflective layer, an improvement in the aperture ratio can be obtained by reducing the gaps between pixel electrodes. Therefore, bright and high-contrast ratio images can be displayed.

Furthermore, the protrusions and depressions of the reflective layer are planarized, so that the orientation of the liquid crystal molecules can be stably controlled. Since the layer for realizing planarization (planarization layer) is not formed between the liquid crystal layer and the pixel electrodes, there is no voltage drop associated with the provision of the planarization layer.

The present invention provides particular advantages when applied to a retroreflection-type LCD comprising a reflective layer having retroreflection characteristics.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 2A is a plan view; and FIGS. 2B and 2C are cross-sectional views taken along line 2b-2b' and 2c-2c' in FIG. 2A, respectively.

DETAILED DESCRIPTION OF PREFERRED EMBODIMENTS

Hereinafter, preferred embodiments of the present invention will be described with reference to the accompanying drawings.

A reflection-type LCD according to the present invention is characterized in that, between pixel electrodes and an active switch layer which includes switching elements, a reflective layer which is connected neither to the pixel electrodes nor the switching elements is provided. In other words, a reflective layer for making it possible to utilize ambient light or light from an external light source for the sake of displaying is provided independently from the pixel electrodes for applying voltages across the liquid crystal layer.

Figure 2A:
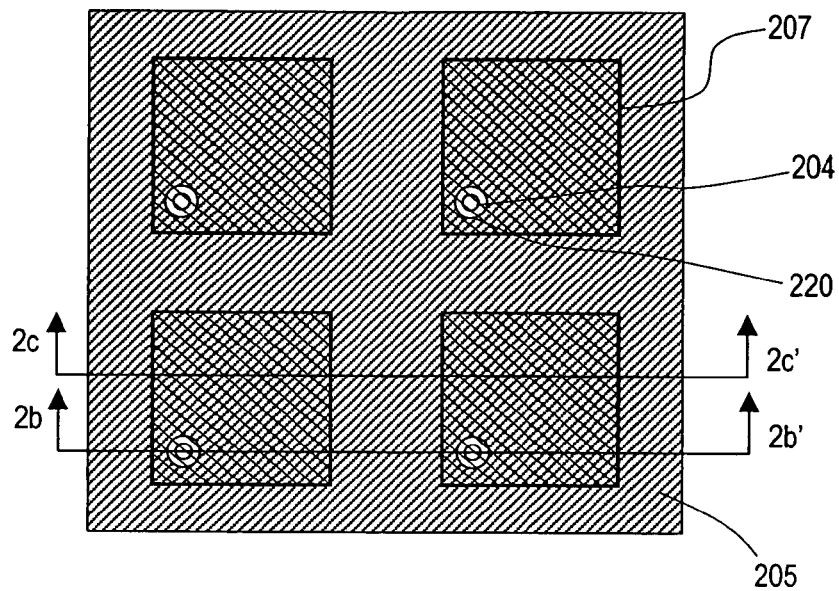
FIGS. 2A, 2B, and 2C are views showing the structure of a reflection-type LCD according to the present invention.
Figure 2B:
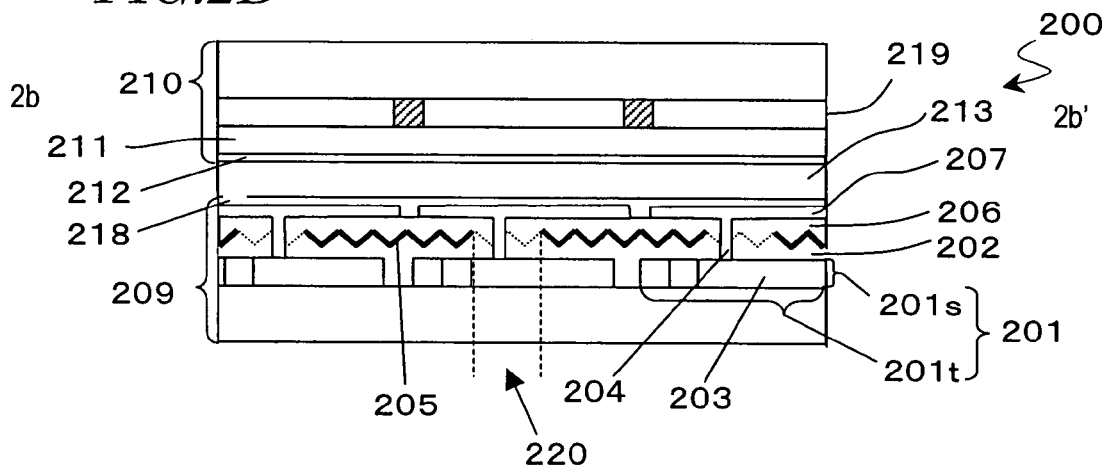
Figure 2C:
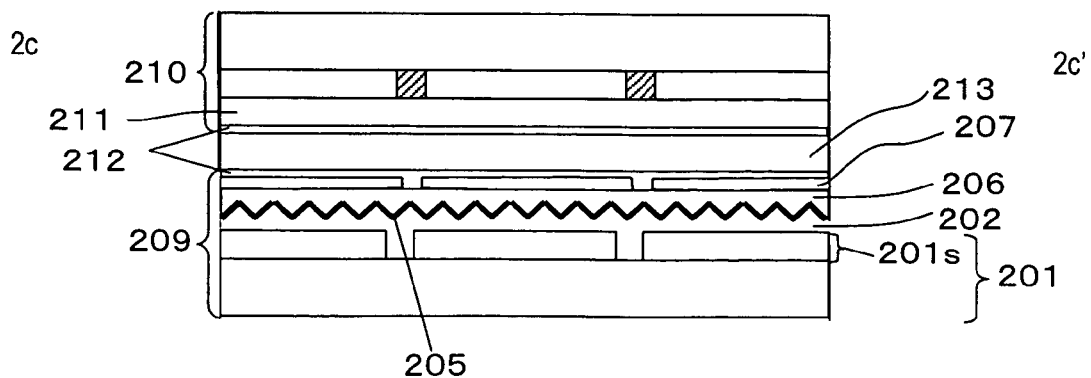

Hereinafter, with reference to FIGS. 2A to 2C, the structure of a reflection-type LCD according to the present invention will be described, by taking a retroreflection-type LCD as an example. FIG. 2A is a plan view of the reflection-type display device 200. FIGS. 2B and 2C are cross-sectional views taken along line 2b-2b' and 2c-2c' in the plan view of FIG. 2A, respectively.

The reflection-type display device 200 comprises: a front substrate 210 on which color filters 219, a transparent counter electrode 211, and an alignment film 212 are provided; a rear substrate 209 provided so as to oppose the front substrate 210; and a liquid crystal layer 213 interposed between the substrates 210 and 209. The rear substrate 209 includes a substrate 201, which has an active switch layer 201s including a plurality of switching elements 201t. Upon the substrate 201, the following elements are disposed in this order: an insulating layer 202 which exhibits a retroreflection property, a reflective layer 205 formed on the insulating layer 202, a planarization resin layer 206, a plurality of transparent pixel electrodes 207, and an alignment layer 218. The surface of the alignment layer 218 is in contact with the liquid crystal layer 213. The substrate 201 is, for example, a TFT substrate whose active switch layer 201s includes a plurality of thin film transistors 201t. The reflective layer 205 has protrusions and depressions corresponding to the surface configuration of the insulating layer 202. Since these protrusions and depressions are flattened out by the planarization resin layer 206, the pixel electrodes 207 and the alignment layer 218 have a substantially planar surface. The insulating layer 202 and the planarization resin layer 206 have a plurality of contact holes 204 formed therein. Each pixel electrode 207 is connected to a drain electrode 203 of a corresponding switching element 201t via a contact hole 204.

As shown in FIG. 2A, the reflective layer 205 is not divided into discrete portions corresponding to the pixels, unlike the reflection electrode 105 of the conventional reflection-type display device (FIG. 1). The reflective layer 205 is formed continuously over the displaying region of the TFT substrate 201, and has openings 220 corresponding to the respective contact holes 204. Since each opening 220 has a larger diameter than the diameter of each contact hole 204, the reflective layer 205 is insulated from the switching elements and the pixel electrodes 207.

The liquid crystal layer 213 may be any modulation layer which is capable of switching between a first state and a second state, the first and second states having respectively different optical characteristics. For example, the liquid crystal layer 213 may be a scattering type liquid crystal layer which is capable of switching between a light scattering state and a light transmitting state, or a liquid crystal layer of an electrically controlled birefringence mode (ECB mode) which can take two or more states associated with respectively different retardations. Alternatively, the liquid crystal layer 213 may be a TN type liquid crystal layer which utilizes the optical rotary power of the liquid crystal layer, for example.

Although not shown, the reflection-type display device 200 further comprises a gate drive circuit for selectively driving the thin film transistors 201t in the TFT substrate 201, a source driver circuit for supplying signals to the pixel electrodes 207, among other elements. The gate drive circuit is connected to gate electrodes of the thin film transistors 201t via gate lines. The source drive circuit is connected to the pixel electrodes 207 via source lines and the thin film transistors 201t.

The reflection-type LCD according to the present invention is not limited to a retroreflection-type LCD. As the reflective layer 205, a diffuse reflection-type LCD including a reflective layer having scatter reflection (also called "diffuse reflection") characteristics may alternatively be used.

The reflection-type display device 200 has the following advantages over the conventional reflection-type display device which has been described with reference to FIG. 1.

In the conventional reflection-type display device, the reflection electrodes 105 have the function of causing retroreflection or diffuse reflection of light, as well as the function of applying voltages across the liquid crystal layer (thus functioning as pixel electrodes). In order to cause retroreflection or diffuse reflection of light, the reflection electrodes 105 need to have protrusions and depressions on their surfaces. On the other hand, in order to function as pixel electrodes, the reflection electrodes 105 need to be spaced apart so as to correspond to the respective pixels. The reflection electrodes 105 as such are formed by patterning a reflective metal layer composed of Ag or the like. However, it is difficult to perform a highly precise patterning for a reflective metal layer having protrusions and depressions on its surface.

In particular, in the case of using a reflective metal layer having a complicated retroreflective configuration based on an array of unit features such as corner cubes, if a patterning of the reflective metal layer is performed along the border lines of the unit features, the interspaces between adjoining reflection electrodes 105 become relatively large, thus resulting in the problems of a lowered aperture ratio and a smaller effective reflecting region. In the present specification, an "aperture ratio" refers to a ratio of an area which contributes to displaying to the entire displaying region, i.e., a ratio of the total area of the pixel electrodes to the area of the displaying region. An "effective reflecting region" refers to a portion of the displaying region in which a reflection surface is formed. However, it is extremely difficult to pattern a reflective metal layer so as to make sufficiently small interspaces between adjoining reflection electrodes 105, without being influenced by the surface configuration of the reflective metal layer. Even if such a patterning is realized, some of the surfaces composing each unit feature (e.g., a corner cube) will be removed in the peripheral portion of each reflection electrode 105 (near the pattern edge), and therefore, sufficient retroreflection characteristics cannot be obtained.

On the other hand, in accordance with the reflection-type display device 200, it is unnecessary to pattern the reflective layer 205, so that the aforementioned problems are avoided. Since the reflective layer 205 is formed continuously over the surface of the substrate 201, an adequate reflection function is exhibited even at the pattern edges of the pixel electrodes 207. Moreover, the pixel electrodes 207 can be formed by patterning a conductive film (e.g., an ITO film) which is formed on the planarization resin layer 206. Patterning of such a conductive film can be performed freely, while escaping the constraints of the protrusions and depressions of the reflective layer 205. Moreover, since the conductive film has a substantially planar surface configuration, it is relatively easy to perform a highly precise patterning for the conductive film. Thus, the interspaces between adjoining pixel electrodes 207 can be made sufficiently small. Furthermore, since the protrusions and depressions on the surface of the reflective layer 205 are flattened out, the liquid crystal in the liquid crystal layer 213 can be aligned well by the alignment layer 218.

It is preferable that each interspace between adjoining pixel electrodes 207 is equal to or greater than 1 μm; under this condition, sufficient insulation can be secured between pixel electrodes 207. Although the upper limit value of the interspaces between adjoining pixel electrodes 207 differs depending on a pitch $P_{pix}$ of the pixel electrodes 207, a sufficiently large aperture ratio can be obtained while the aperture ratio is equal to or less than 30 μm.

The diameter of each opening 220 simply needs to be greater than the diameter of each contact hole 204. However, it is preferable that the diameter of each opening 220 is small enough to obtain a sufficient effective reflecting region (i.e., a sufficient area of the reflective layer 205), e.g., 30 μm or less, although this value will depend on the resolution of the display device. On the other hand, it is preferable that the diameter of each contact hole 204 is large enough to ensure insulation from a contact portion (composed of a conductive material) which is provided inside the contact hole 204, e.g., 1 μm or more.

The rear substrate 209 of the reflection-type display device 200 can be produced by the following method, for example.

Figure 3A:
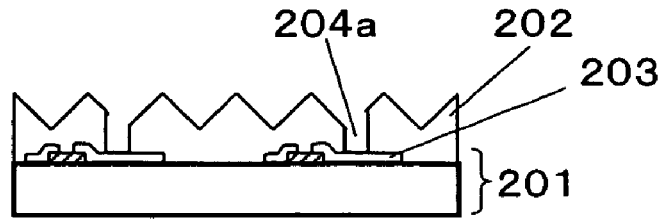
FIGS. 3A, 3B, 3C, 3D, and 3E are cross-sectional views illustrating steps of an exemplary method of producing a rear substrate in the present invention.

First, as shown in FIG. 3A, on the surface of the TFT substrate 201 having a plurality of TFTs thereon, the insulating layer 202 having a retroreflective configuration is formed. Thereafter, a plurality of contact holes 204a, which are deep enough to reach the drain electrodes 203 of the TFTs in the TFT substrate 201, are formed in the insulating layer 202. Instead of the TFT substrate 201, a substrate having any other type of switching elements thereon may alternatively be used.

Figure 3B:
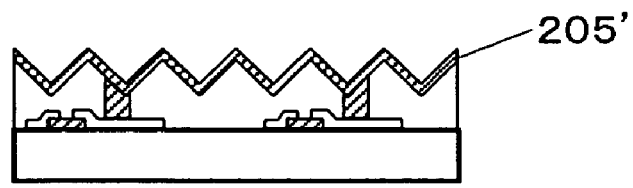

Thereafter, as shown in FIG. 3B, a metal 205' to become the reflective layer (e.g., Ag) is deposited on the inside of the contact holes 204a and on the insulating layer 202.

Figure 3C:
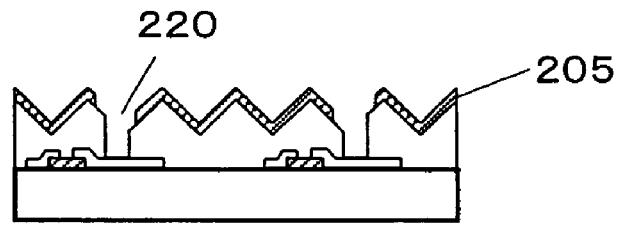

Next, as shown in FIG. 3C, portions of the metal 205' which are located inside the contact holes 204 and above the contact holes 204 are removed, thereby forming the openings 220. The diameter of each opening 220 is prescribed so as to be greater than the diameter of each contact hole 204. As a result, the reflective layer 205 is obtained.

Figure 3D:
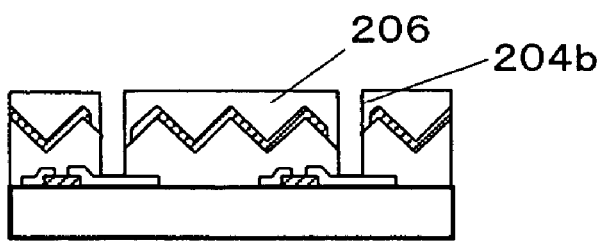

Then, as shown in FIG. 3D, the planarization resin layer 206 is formed so as to flatten out the protrusions and depressions of the retroreflective configuration of the reflective layer 205. Contact holes 204b are also formed in the planarization resin layer 206 so as to be substantially aligned with the contact holes 204a in the insulating layer 202.

Figure 3E:
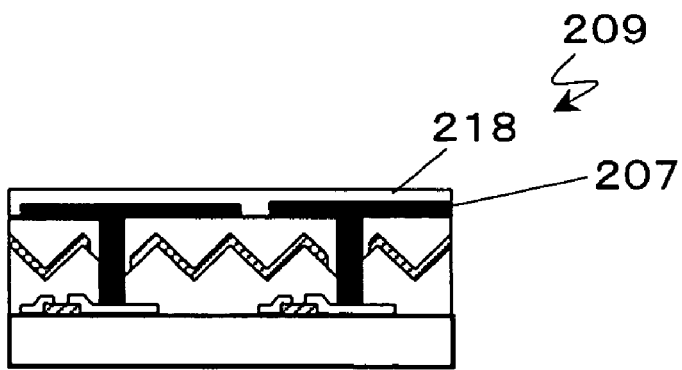

Thereafter, as shown in FIG. 3E, a transparent conductive film (e.g., an ITO film) is formed on the planarization resin layer 206 and on the inside of the contact holes 204a ands 204b, and is patterned. As a result, the pixel electrodes 207 are formed. The pixel electrodes 207 are electrically connected to the drain electrodes 203 of the TFTs via the contact holes 204a and 204b. On the pixel electrodes 207 and the planarization resin layer 206, the alignment layer 218 for realizing liquid crystal alignment is formed. Thus, the rear substrate 209 is obtained.

By using the rear substrate 209 which has been obtained in the aforementioned manner, the reflection-type display device 200 can be produced through processes similar to those used for producing a conventional reflection-type LCD. Specifically, the rear substrate 209 is attached to the front substrate 210 having the color filter layer 219 (in which RGB color patterns are delineated by black edges), the transparent conductive film 211 and the alignment layer 212 thereon, and the liquid crystal layer 213 is formed between the substrates 209 and 210.

First Embodiment

Hereinafter, a first embodiment of the reflection-type LCD according to the present invention will be described.

Figure 4A:
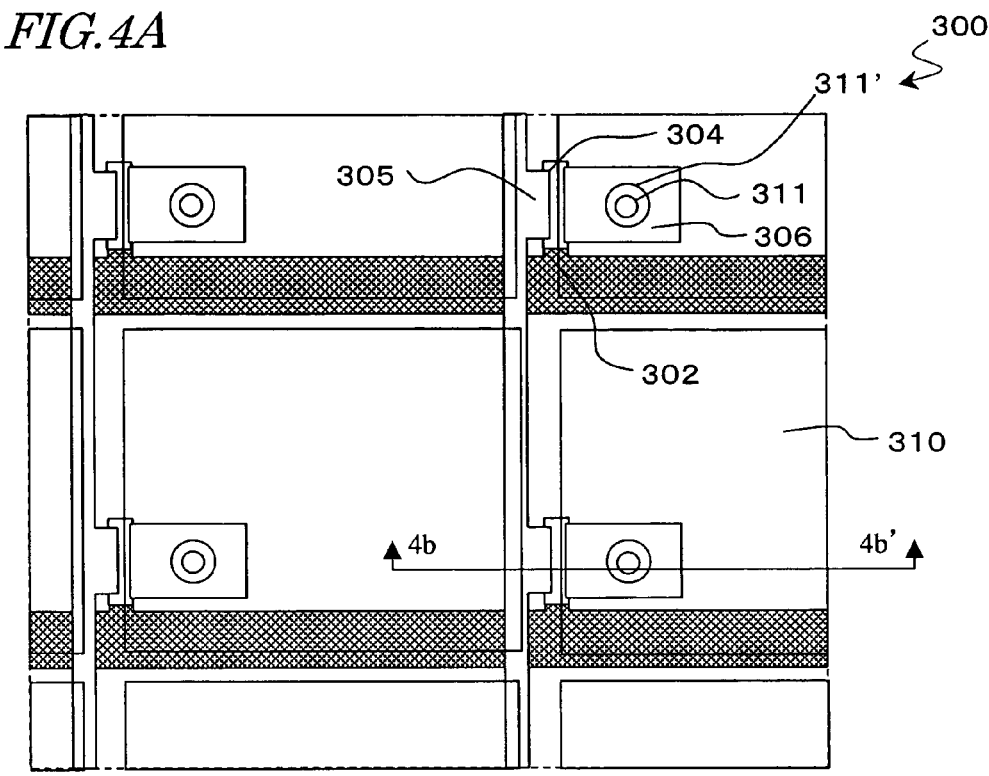
FIGS. 4A and 4B are a plan view and a cross-sectional view (taken along line 4b-4b' in FIG. 4A), respectively, showing the structure of a rear substrate in a first embodiment of the present invention.
Figure 4B:
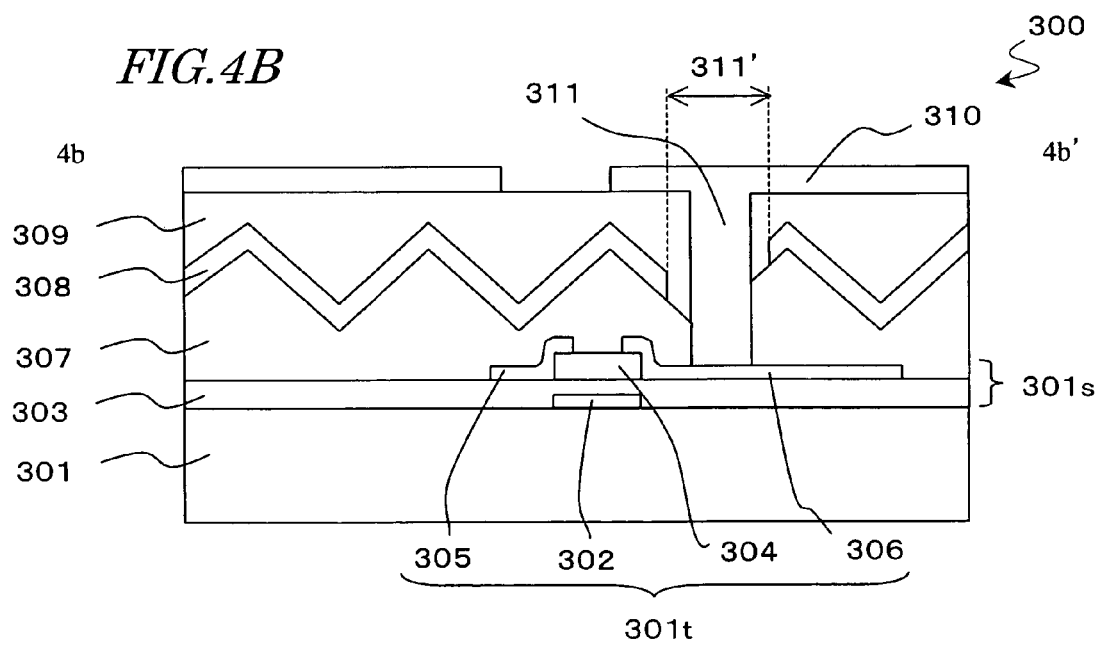

FIG. 4A is a plan view showing the structure of a rear substrate (TFT-side substrate) 300 in the reflection-type LCD of the present embodiment. FIG. 4B is a cross-sectional view taken along line 4b-4b' in the plan view of FIG. 4A.

The rear substrate 300 includes the following elements which are disposed in this order on a substrate 301: an active switch layer 301s; an insulating layer 307; a reflective layer 308; a planarization resin layer 309; and pixel electrodes 310. In the present embodiment, the active switch layer 301s includes a plurality of thin film transistors 301t. Each thin film transistor 301t includes, for example, a gate electrode 302, a gate insulative film 303 covering the gate electrode 302, a semiconductor layer 304 formed on the gate insulative film 303, a source line and source bus 305, and a drain electrode 306. Although the thin film transistors 301t are illustrated as having a bottom gate structure, they may alternatively have a top gate structure. The surface of the insulating layer 307 has a retroreflective configuration based on an array of a plurality of corner cubes; therefore, the reflective layer 308 is a retroreflective layer. Each pixel electrode 310 is connected to the drain electrode 306 of the corresponding thin film transistor 301t via a contact portion 311 provided in the planarization resin layer 309 and the insulative film 303. Since the reflective layer 308 has openings 311', each of which is sized so as not to be in contact with the contact portion 311, the reflective layer 308 and the pixel electrodes 310 are not in electrical conduction with each other.

Each pixel electrode 310 is sized 60 μm×180 μm, for example. The gap width between adjoining pixel electrodes 310 is no less than 3 μm and no more than 8 μm, for example. The unit features (corner cubes) in the retroreflective layer 308 are arranged with a pitch of 3 μm to 20 μm, for example. The level difference between the depressions and the protrusions of the retroreflective layer 308 is 3 μm to 16 μm, for example.

Figure 5A:
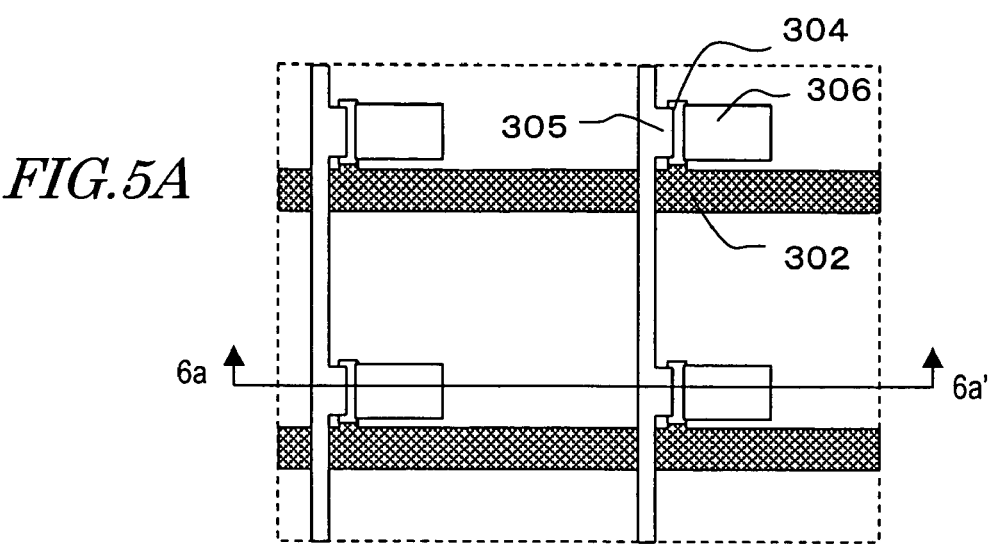
FIGS. 5A, 5B, and 5C are plan views illustrating steps of forming a rear substrate in the first embodiment of the present invention.
Figure 5B:
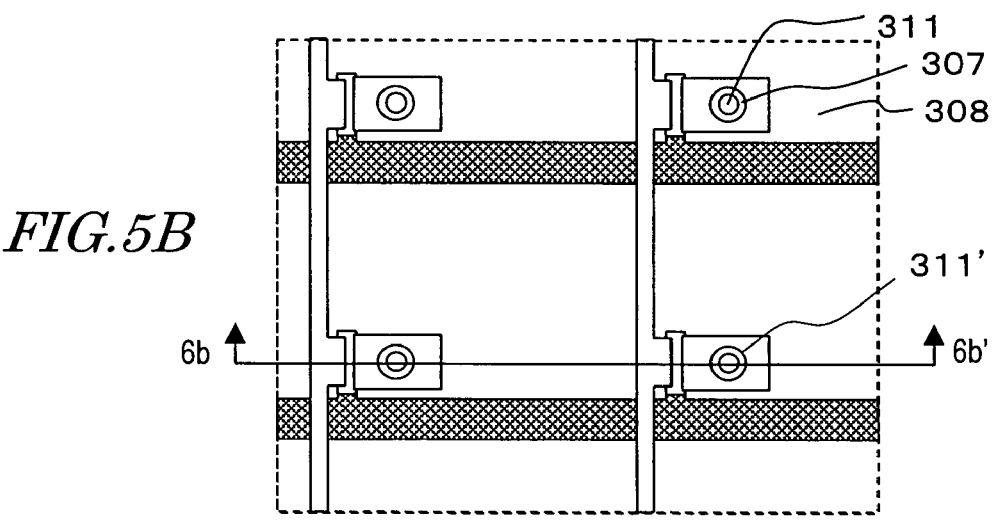
Figure 5C:
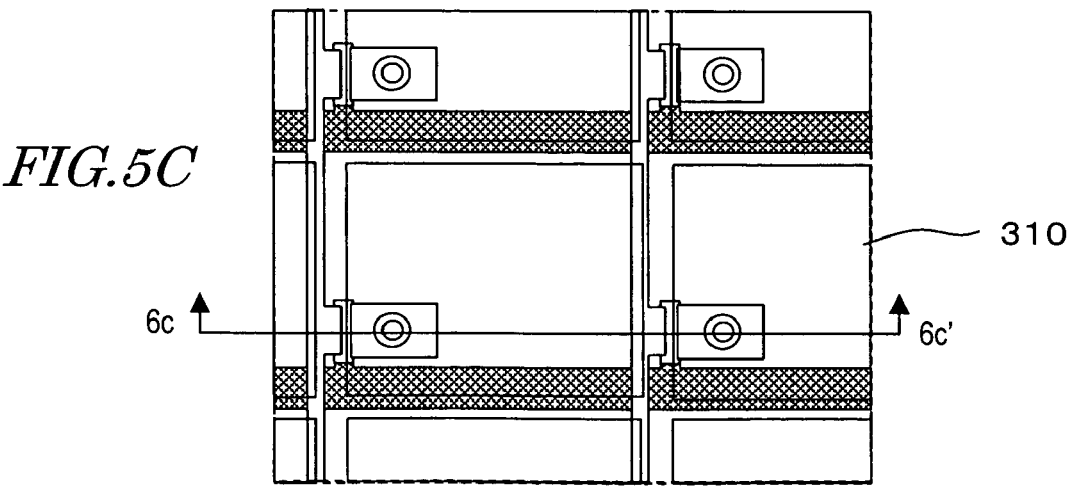
Figure 6A:
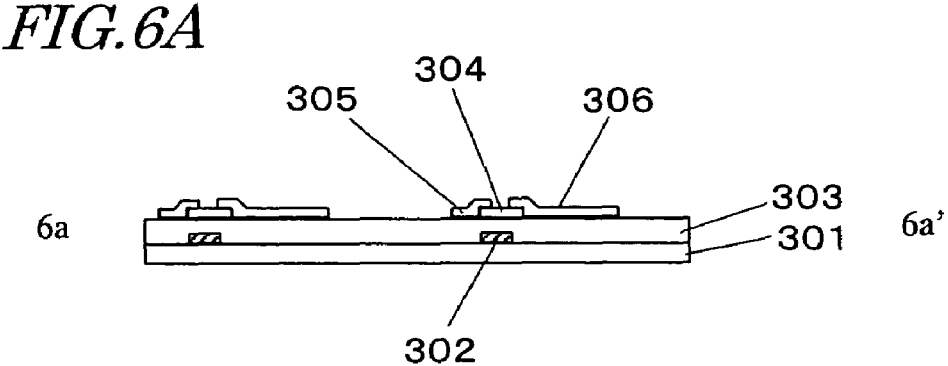
FIGS. 6A, 6B, and 6C are cross-sectional views taken along lines 6a-6a', 6b-6b', and 6c-6c' in FIGS. 5A to 5C, respectively.
Figure 6B:
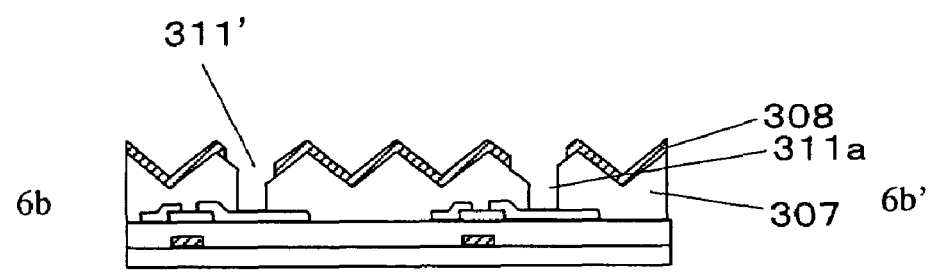
Figure 6C:
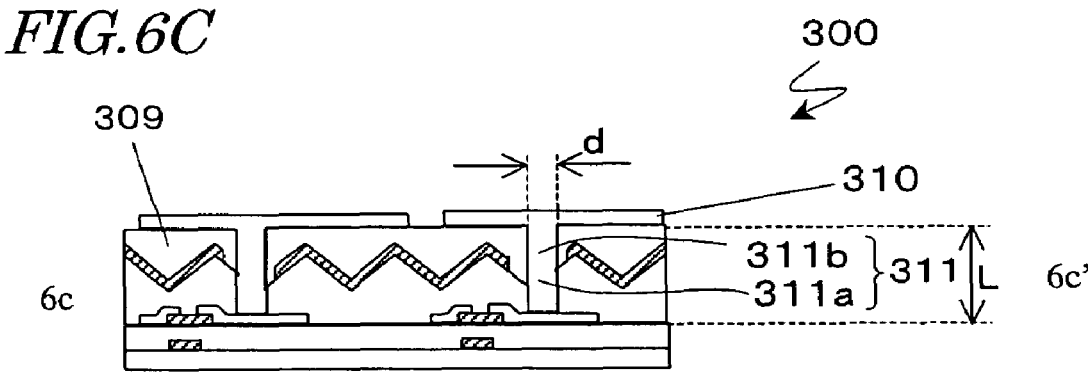

The rear substrate 300 of the reflection-type LCD can be produced by a method similar to the method described with reference to FIG. 3. Hereinafter, the method for producing the rear substrate 300 will be described more specifically, with reference to the drawings. FIGS. 5A, 5B, and 5C are plan views illustrating steps of forming the rear substrate 300. FIGS. 6A, 6B, and 6C are cross-sectional views taken along lines 6a-6a', 6b-6b', and 6c-6c' in FIGS. 5A to 5C, respectively.

First, a TFT substrate is formed as shown in FIGS. 5A and 6A. The TFT substrate can be formed in the following manner, for example. After the gate lines and gate buses 302 (e.g., tantalum (Ta)) are formed on the substrate 301, the gate insulative film 303 (e.g., a tantalum oxide film) is formed thereupon. Thereafter, the semiconductor layers 304 (e.g., amorphous silicon) are formed. A source line and source bus 305 (e.g., titanium (Ti)) is formed so as to be in contact with one end of each semiconductor layer 304, and a drain electrode 306 is formed so as to be in contact with the other end of each semiconductor layer 304. In order to simplify the process, the source lines and source buses 305 are preferably formed in the same layer as that of the drain electrodes 306. Thereafter, in order to improve the reliability of the TFTs, an insulative film (e.g., silicon nitride) may be formed.

Next, as shown in FIGS. 5B and 6B, the insulating layer 307 having contact holes 311a therein and the reflective layer 308, which is to be disposed on the insulating layer 307 and has openings 311' larger than the contact holes 311a, are formed. Specifically, the insulating layer 307 and the reflective layer 308 can be formed in the following manner.

The insulating layer 307 (thickness: e.g. 5 μm) can be formed by, after forming a resin layer compose of a transfer resin material on the TFT substrate, transferring the configuration of a master (template) having protrusions and depressions thereon to the resin layer, by using an embossing technique or the like. Although there are no particular limitations as to the material of the insulating layer 307, the material may be acrylic resin, for example. Thereafter, a resist mask is formed on the insulating layer 307 by a photolithography technique or the like. By etching the insulating layer 307 using this resist mask, the contact holes (diameter: e.g. 5 μm) 311a which reach the drain electrodes 306 of the TFTs are formed.

The reflective layer 308 is formed by depositing a layer of reflective metal (e.g., an Ag layer) over the surface of the insulating layer 307 and in the contact holes 311a of the insulating layer 307, and etching away the portions of the Ag layer which are located inside or above the contact holes 311a. In order not to be in contact with a conductive layer which will be later formed in the contact holes 311a, the reflective layer 308 needs to have openings 311' above the respective contact holes 311a, such that each opening 311' has a greater diameter (e.g., 10 μm) than that of each contact hole 311a. Such a reflective layer 308 can be formed by, for example, forming an etching mask which will leave exposed the portions of the Ag layer to become the openings 311', and performing a dry or wet etching using this mask. Alternatively, the reflective layer 308 can be formed by performing a wet etching for the Ag layer by using an etching mask having substantially the same shape as that of the resist mask which was used for forming the contact holes 311a in the insulating layer 307; in this manner, openings 311 which are larger than the contact holes 311a can be formed in the Ag layer through overetching.

Thereafter, as shown in FIGS. 5C and 6C, the planarization resin layer 309 and the pixel electrodes 310 are formed, whereby the rear substrate 300 is completed.

The planarization resin layer 309 can be obtained by forming a resin layer covering the reflective layer 308, and thereafter forming contact holes 311b in the resin layer, such that each contact hole 311b is aligned with a corresponding contact hole 311a. Each contact hole 311b has substantially the same size as that of each contact hole 311a. As the material of the planarization resin layer 309, a material which facilitates the making of the contact holes 311b is preferably used, e.g., a resin material which can be processed through photolithography. In order not to degrade the retroreflection characteristics of the reflective layer 308, it is necessary to employ a material having a high transmittance. An example of a material which can be processed through photolithography and has a high transmittance is an acrylic resin which can be patterned through UV exposure. It is preferable that the planarization resin layer 309 is sufficiently thick (e.g., 5 μm or more) for flattening out the retroreflective configuration of the reflective layer 308.

On the other hand, the pixel electrodes 310 can be produced by forming a transparent conductive film (e.g., indium tin oxide (ITO)) above the planarization resin layer 309 and inside the contact holes 311a and 311b (which will together be referred to as "contact holes 311"), and patterning the transparent conductive film into pixel electrode shapes. In the case where the height of the contact holes 311 (i.e., the total height of the contact holes 311a and 311b) L is as small as several micrometers or less, or where each contact hole 311 has a tapered cross section, a usual vapor deposition technique such as sputtering can be used to form the transparent conductive film inside the contact holes 311. However, in the case where the height L is relatively large, e.g., equal to or greater than twice as much as the diameter d of the contact holes 311 (i.e., $L/d \geq 2$), it will be difficult with a vapor deposition technique to form a transparent conductive film inside the contact holes 311 such that the transparent conductive film will reach the surfaces of the drain electrodes 306. In the latter case, preferably, a solution-type conductive material is used as the material of the transparent conductive film, and the transparent conductive film is formed inside the contact holes 311 by using an ink jet technique.

Moreover, the transparent conductive film may be composed of two different materials, i.e., the contact portions to be formed inside the contact holes 311 may be composed of a different material from the material of the pixel electrode portions formed on the planarization resin layer 309. For example, the contact portions may be formed of a material which can be formed into a thick film, and the pixel electrode portions may be formed by using a material which can be deposited through a vapor deposition technique or the like. Note that, regardless of the method of forming the transparent conductive film (pixel electrodes 310), the material(s) of the transparent conductive film has a high transmittance in order not to degrade the retroreflection characteristics of the reflective layer 308.

By using the rear substrate 300 which has been obtained as described above, a reflection-type LCD according to the present embodiment can be produced through processes similar to those used for producing a conventional reflection-type LCD. A specific method will be described below.

First, a polyimide film is formed on the rear substrate 300, and the polyimide film is rubbed with a cloth to form an alignment layer for controlling the directions of liquid crystal molecules. On the other hand, a front substrate having a color filter layer, a transparent conductive film, and an alignment layer thereon is formed. The alignment layer of the front substrate can also be formed by a method similar to the method for forming the alignment layer of the rear substrate 300. Next, the rear substrate 300 and the front substrate are attached together, and a liquid crystal layer is formed therebetween. The liquid crystal layer may be formed of a polymer dispersed liquid crystal (PDLC) material. Preferably, the liquid crystal layer is a so-called reverse-type PDLC, which appears transparent in the absence of an applied voltage. Thus, the reflection-type LCD of the present embodiment is completed.

The liquid crystal layer in the present embodiment is composed of a reverse-type PDLC having a liquid crystal backbone (mesogen groups) in its polymeric structure, and is capable of switching between a black displaying state and a white displaying state by varying the voltage applied across the liquid crystal layer, as described below. Hereinafter, the operation thereof will be described.

When the voltage applied across the liquid crystal layer is sufficiently low (i.e., in the absence of an applied voltage), the liquid crystal layer is in a transparent state. At this time, if the mesogen groups in the polymer are well aligned with the nematic liquid crystal, a good transparency can be obtained irrespective of the viewing angle; thus, the retroreflection property of the display device can be fully utilized, and good black displaying characteristics can be obtained. On the other hand, when a predetermined voltage is applied across the liquid crystal layer, the nematic liquid crystal molecules move in accordance with the electric field, but the mesogen groups in the polymeric structure are unlikely to move. As a result, a refractive index difference occurs between the nematic liquid crystal and the mesogen groups so as to cause the light entering the liquid crystal layer to be scattered, whereby white displaying characteristics are obtained.

As used herein, "absence of an applied voltage" refers to not only a state where the voltage applied across the liquid crystal layer is 0 V, but also a state where the voltage applied across the liquid crystal layer is lower than a voltage which causes an optical change in the liquid crystal layer such that scattering of the light entering the liquid crystal layer is observed.

The aforementioned reverse-type PDLC can be formed by preparing a prepolymer/liquid crystal mixture containing a low-molecular-weight liquid crystal composition and an unpolymerized prepolymer, and irradiating the prepolymer/liquid crystal mixture with UV (ultraviolet) to polymerize the unpolymerized prepolymer. In the example illustrated herein, a prepolymer/liquid crystal mixture containing a low-molecular-weight liquid crystal material and additionally 4% monoacrylate containing mesogen groups, 2% diacrylate containing mesogen groups, and 1% reaction initiator is prepared, and the prepolymer/liquid crystal mixture is irradiated with UV (e.g. 1 mW/cm$^2$) for 20 minutes. However, the composition and curing condition of the liquid crystal material are not limited thereto.

Instead of reverse-type PDLC, a normal-type scattering liquid crystal material which does not include a liquid crystal backbone in its polymeric structure may alternatively be used. In this case, the liquid crystal layer will be in a scattering state in the absence of an applied voltage, and in a transparent state under an applied voltage. Similarly to reverse-type PDLC, normal-type PDLC also has a structure in which nematic liquid crystal is present within a polymeric structure. However, unlike reverse-type PDLC, normal-type PDLC does not contain mesogen groups in its polymeric structure. In this case, in the absence of an applied voltage, the liquid crystal molecules are randomly oriented so that the liquid crystal layer scatters light (scattering state), thus resulting in a white displaying state. On the other hand, under an applied voltage, the refractive index of the nematic liquid crystal molecules, which are oriented in accordance with the electric field, matches the refractive index of the polymer; therefore, the liquid crystal layer becomes transparent, thus resulting in a black displaying state. Note that it is difficult to ensure matching between the refractive index of the birefringent nematic liquid crystal and the refractive index of the non-birefringent polymer across the entire range of viewing angles, and therefore transparency as viewed from an oblique viewing angle is especially likely to be degraded. However, normal-type PDLC may also be a preferable choice depending on the purpose of use, because normal-type PDLC still provides a practical level of transparency and also provides high scattering characteristics in the absence of an applied voltage.

In the case where normal-type PDLC is adopted, it is common practice not to perform an alignment treatment. However, as necessary, an organic film such as polyimide may be applied on the surface of the substrate on which the liquid crystal layer is to be formed.

In the case where PDLC is employed as the material composing the liquid crystal layer, a lower planarity is required of the planarization layer than in the case where other materials (e.g. cholesteric liquid crystal (described later)) are used. Moreover, the thickness of the planarization layer only needs to be equal to or greater than a thickness which prevents electrical conduction between the reflective metal and the pixel electrodes, e.g., 3 μm.

As a scattering type liquid crystal material other than PDLC, a cholesteric liquid crystal material having a reflection band in the infrared region may also be used. A cholesteric liquid crystal material is formed by adding a chiral agent having a chiral center to a nematic liquid crystal material. The amount of chiral agent to be added is adjusted so as to obtain a helical pitch for reflecting light in a desired band. Since a liquid crystal layer composed of cholesteric liquid crystal will have different driving voltages and/or scattering characteristics depending on the thickness, it is preferable to reduce variations in the thickness of the liquid crystal layer.

Although the present embodiment illustrates an LCD of a scattering type display mode, a dynamic scatter mode or any other phase transition mode is also applicable as the display mode of the LCD according to the present invention.

Figure 1A:
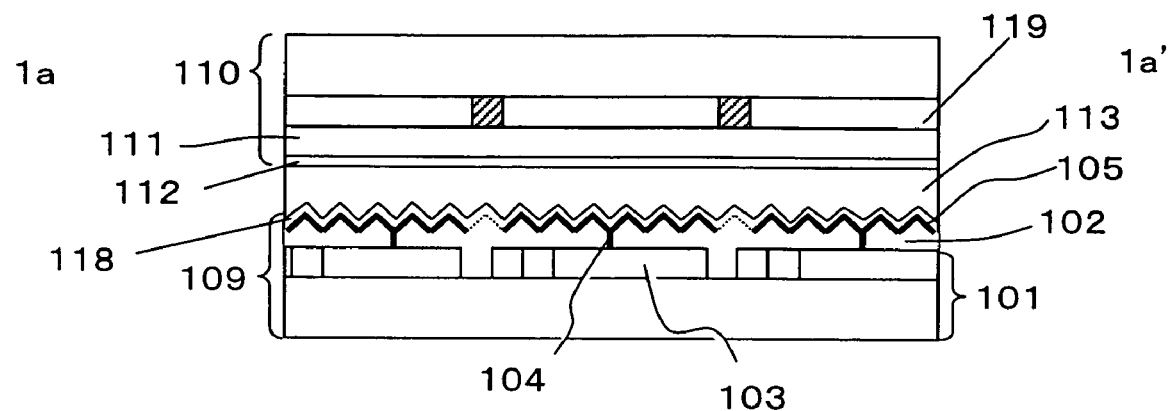
FIG. 1A is schematic cross-sectional view showing the structure of a conventional retroreflection-type LCD.
Figure 1B:
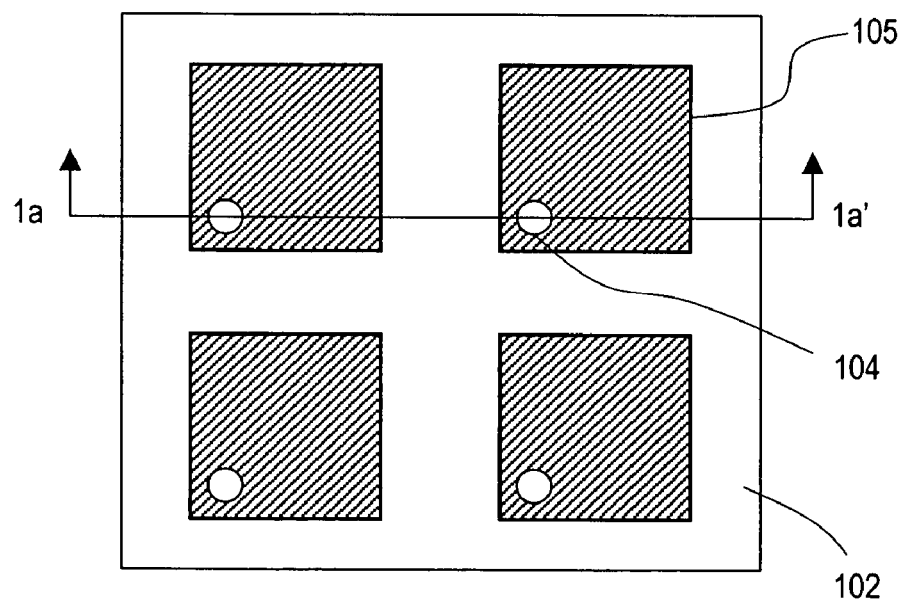
FIG. 1B is a plan view showing reflection electrodes in the display device of FIG. 1A.

The reflection-type LCD according to the present embodiment has an advantage in that the interspaces between electrodes can be reduced as compared to a reflection-type LCD having reflection electrodes which function as a reflective layer and as pixel electrodes (e.g., the display device shown in FIGS. 1A and 1B). This advantage will be described in detail below.

Figure 7:
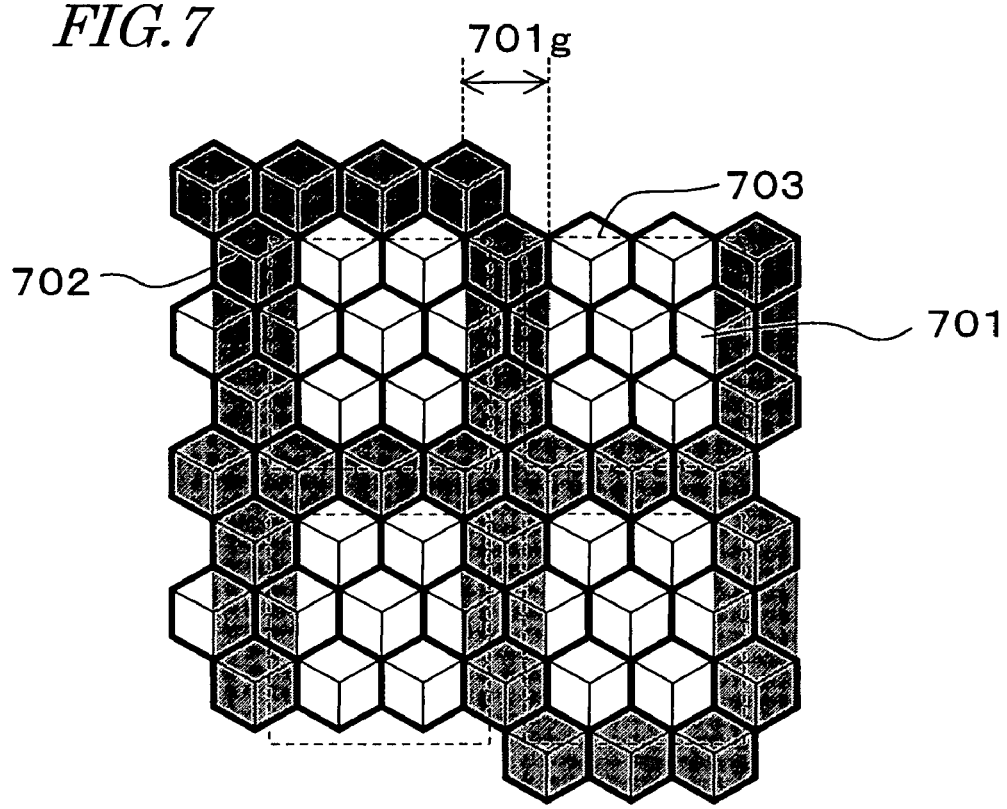
FIG. 7 is a plan view illustrating the shapes of pixel electrodes in a conventional retroreflection-type LCD.

First, FIG. 7 will be referred to FIG. 7 is a plan view illustrating the shapes of pixel electrodes 701 of the conventional display device shown in FIG. 1. The pixel electrodes 701 of the conventional display device are formed by patterning a reflective metal layer having a retroreflective configuration (e.g., an Ag layer). The reflective metal layer has an array of unit features 702. Each unit feature 702 may be e.g. a corner cube, and is preferably a cubic corner cube. The reflective metal layer has intensive protrusions and depressions, and, owing to its retroreflection property, tends to retroreflect the light which is used during photolithography. Therefore, when forming the pixel electrodes from a reflective metal layer having a retroreflective configuration in accordance with the design as shown by dotted lines 703, it is quite difficult to form the pattern edges of the pixel electrodes as designed (i.e., so as to conform to the dotted lines 703). The pattern edges of the pixel electrodes 701 to be actually formed through the patterning will deviate from the dotted lines 703, depending on the shape of each unit feature 702. As a result, each gap 701g between adjoining pixel electrodes 701 will become much larger than the designed value so as to be aligned with the unit features 702. Specifically, the width of each gap 701g will be equal to the pitch of the unit features, or n times that value (where n is an integer equal to or greater than two).

To be more specific, if the designed gap width is equal to or less than the unit feature pitch, the width of each gap 701g of the actually-formed pixel electrodes 701 will be equal to the unit feature pitch, or n times that value (where n is an integer equal to or greater than two). If the designed gap width is greater than (m−1) times and is equal to or less than m times the unit feature pitch (where m is an integer greater than two), the actual gap width 701g will be equal to m times the unit feature pitch, or (m+k) times the unit feature pitch (where k is an integer equal to or greater than one). For example, if the designed gap width is 6 μm and the unit feature pitch is 10 μm, the gap width 701g will be 10 μm, or n times as much as 10 μm (i.e., 20 μm, 30 μm, etc.). If the designed gap width is 10 μm and the unit feature pitch is 6 μm, the gap width 701g will be 12 μm, or (2+k) times as much as 6 μm (i.e., 18 μm, 24 μm, etc.).

Figure 8:
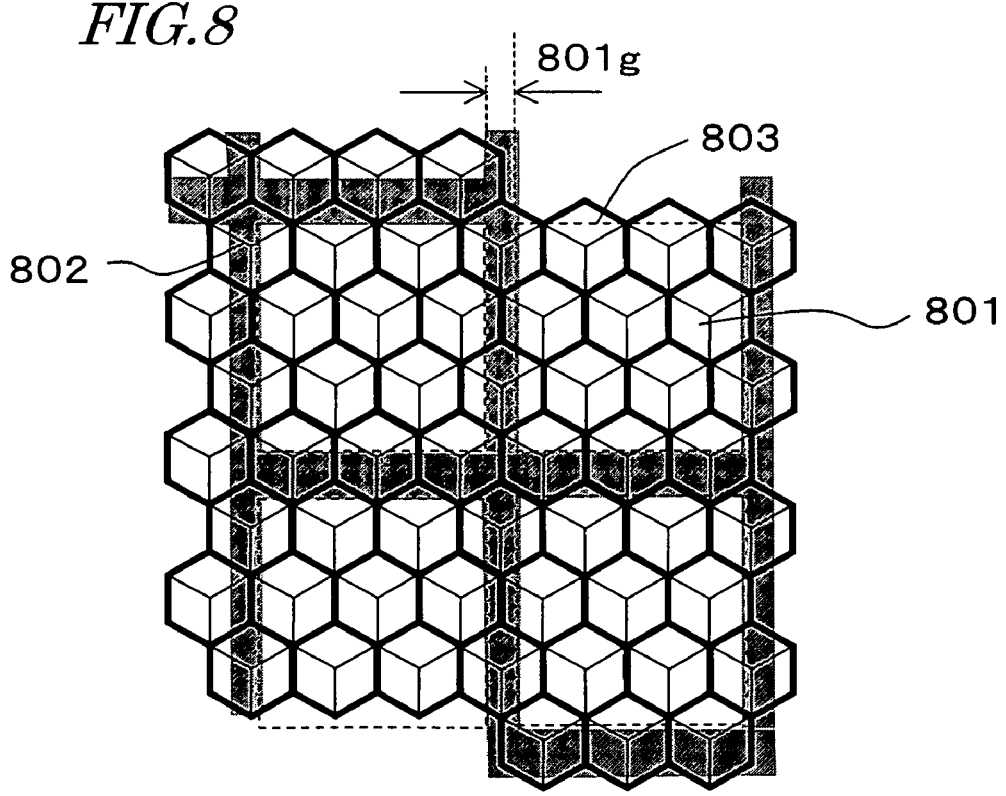
FIG. 8 is a plan view illustrating the shapes of pixel electrodes in a retroreflection-type LCD according to the first embodiment of the present invention.

Next, FIG. 8 will be referred to. FIG. 8 is a plan view illustrating the shapes of pixel electrodes 801 according to the present embodiment. In the present embodiment, the pixel electrodes 801 are formed on a retroreflective layer having an array of unit features 802, with a planarization resin layer interposed between the pixel electrodes 801 and the retroreflective layer. The pixel electrodes 801 are produced by forming a transparent conductive film on the planarization resin layer, and patterning the transparent conductive film. Since the transparent conductive film has a planarized surface, the photolithography which is conducted when patterning the transparent conductive film is not affected by the protrusions and depressions of the retroreflective layer, and is performed with a usual resolution. Therefore, if a pixel electrode pattern is designed as shown by the dotted lines 703, the transparent conductive film will be patterned substantially as dictated by that design, so that the width of the gaps 801g between adjoining pixel electrodes 801 can be kept small.

Thus, the width of the gaps 801g between adjoining pixel electrodes 801 is determined independently of the unit feature pitch. For example, if the designed gap width is 6 μm and the unit feature pitch is 10 μm, the gap width 801g of the actually-formed pixel electrode 801 will be 6 μm. If the designed gap width is 10 μm and the unit feature pitch is 6 μm, the gap width 801g will be 10 μm.

Thus, according to the present embodiment, the width of the gaps 801g between adjoining pixel electrodes 801 can be reduced as compared to the conventional width, whereby the aperture ratio of the display device is improved.

Next, with reference to the drawings, the relationship between the design value and the actual value of the pixel electrode gap width will be described in more detail, in the case where the unit features 702 or 802 of the reflective metal layer or the retroreflective layer are cubic corner cubes having three substantially square faces which are perpendicular to one another. In the following description, any reference to a dimension should be construed as a dimension as measured in the plan view.

Figure 16A:
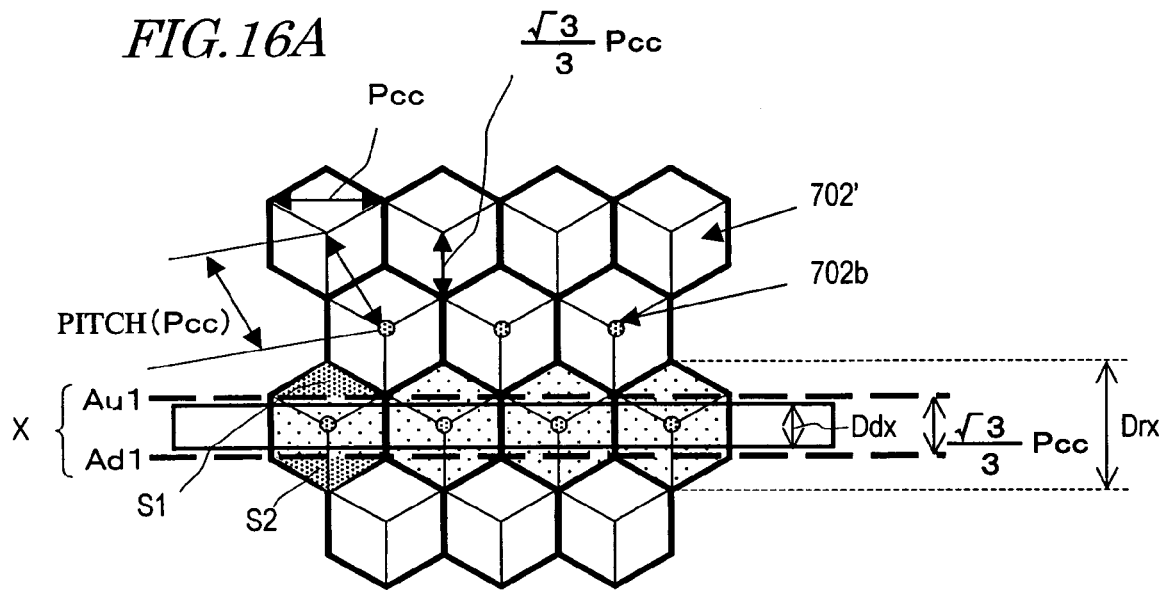
FIGS. 16A and 16B are schematic enlarged diagrams for explaining a relationship between a design value and an actual value of a gap width between pixel electrodes in a conventional retroreflection-type LCD.
Figure 16B:
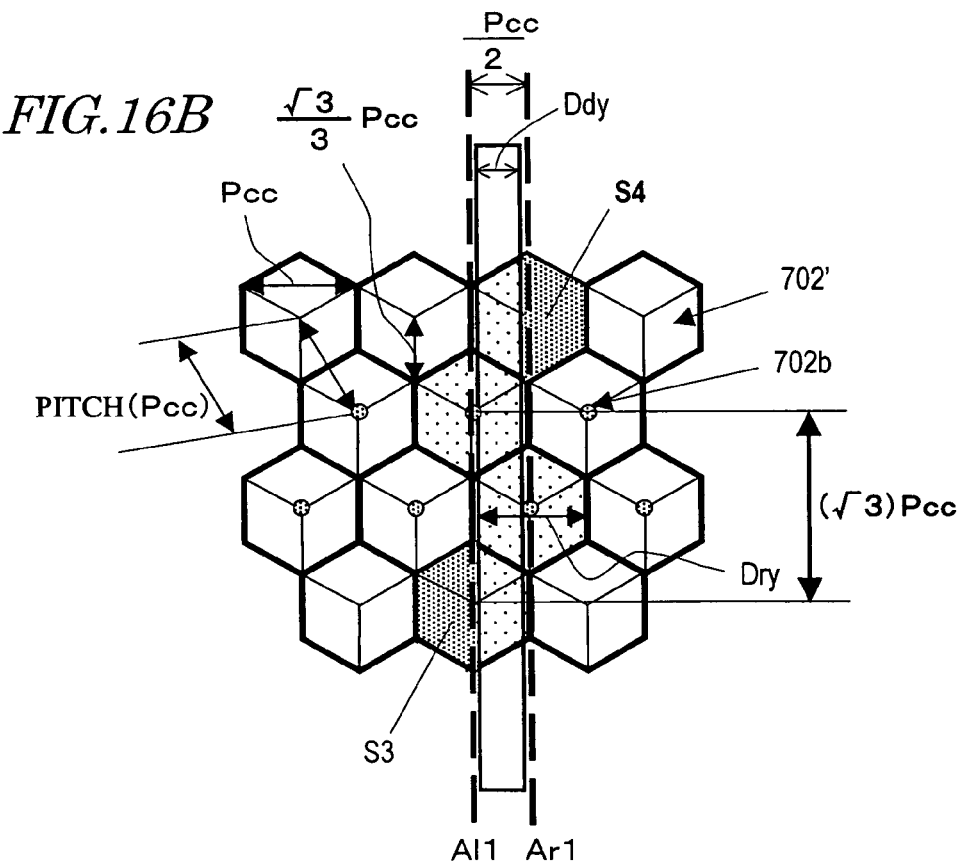
Figure 17A:
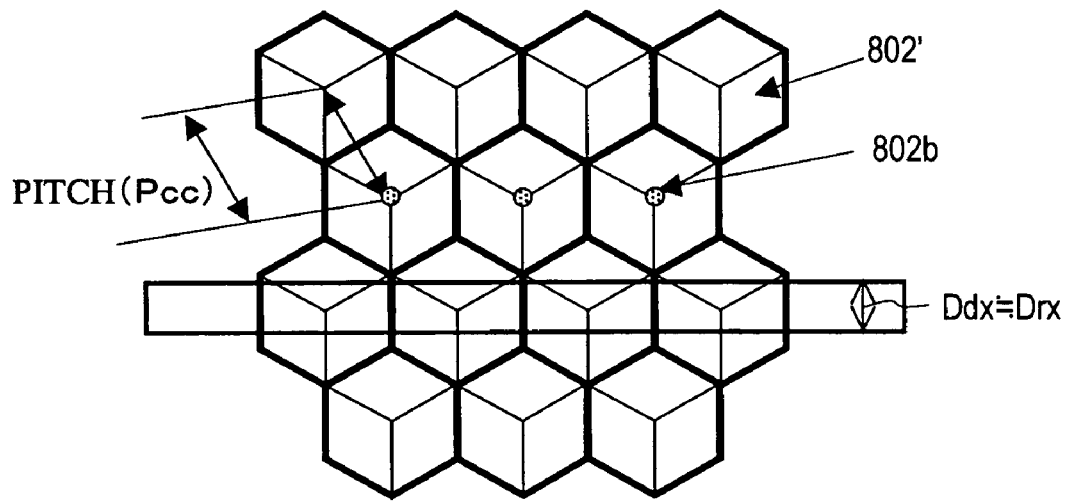
FIGS. 17A and 17B are schematic enlarged diagrams for explaining a relationship between a design value and an actual value of a gap width between pixel electrodes in a retroreflection-type LCD according to the first embodiment of the present invention.
Figure 17B:
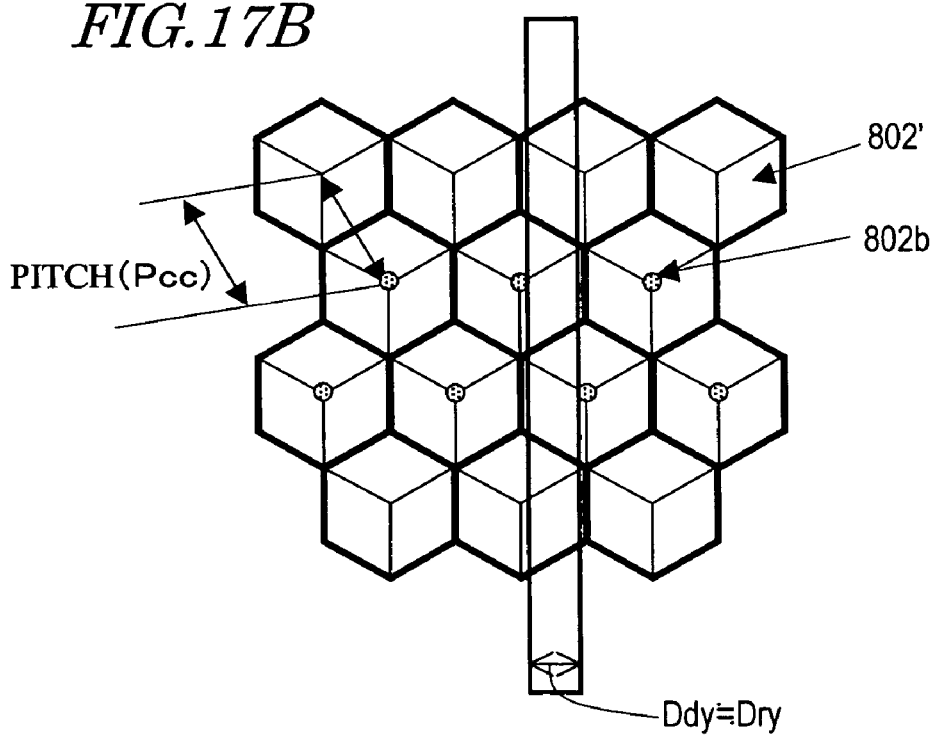

FIGS. 16A and 16B are enlarged versions of the plan view of FIG. 7 showing the conventional display device, and explain a relationship between a design value and an actual value of the gap width between pixel electrodes which are provided along the x direction and the y direction in a conventional display device. FIGS. 17A and 17B are enlarged versions of the plan view of FIG. 8 showing the display device of the present embodiment, and explain a relationship between a design value and an actual value of the gap width between pixel electrodes which are provided along the x direction and the y direction in the display device of the present embodiment.

In the following description, the distance between bottom points 702b or 802b of any two adjoining corner cubes 702' or 802' is defined as a pitch $P_{cc}$ of the corner cubes 702' or 802'. A direction along which the bottom points 702b or 802b of adjoining corner cubes 702' or 802' are aligned is defined as the x direction, whereas a direction perpendicular to the x direction is defined as the y direction. One side of the square constituting each corner cube 702' or 802' has a length equal to $(\sqrt{3})/3 \times P_{cc}$. Note that each pixel electrode is designed in a rectangular shape such that the substantially shorter or longer sides thereof are parallel to the x direction. Thus, there are two kinds of gaps between pixel electrodes: gaps extending along the x direction and gaps extending along the y direction.

First, with reference to FIG. 16A, the gaps extending along the x direction between pixel electrodes will be described.

In a conventional display device, the pixel electrodes are obtained by forming a resist pattern on a metal reflective layer which has an array of corner cubes 702' and then etching the metal reflective layer by using the resist pattern as a mask. The resist pattern itself can be formed by subjecting a resist film which is formed on the metal reflective layer to exposure and then development. The exposure of the resist film is performed by using a photomask. Herein, the photomask is designed so as to define the width of each gap extending along the x direction (hereinafter referred to as the "gap design value $Dd_x$") to be equal to or less than the length of one side of the corner cube 702' (i.e., $Dd_x \leq (\sqrt{3})/3 \times P_{cc}$). Moreover, the photomask is placed in such a manner that each gap (as defined by the photomask) extending along the x direction is interposed between lines Ad1 and Au1, each of which connects between saddle points of the corner cubes 702 in a row X.

When patterning a resist film on the metal reflective layer by using the above photomask, the light which is used during photolithography is retroreflected in the depression of each corner cube, so that, an area of the resist film which is greater than the area which is expected to be removed according to the photomask design will be removed. As a result, the gap width between pixel electrodes 701 as dictated by the actual resist pattern which is obtained after development (hereinafter referred to as the "resist pattern gap width" $Dr_x$) will be greater than the gap design value $Dd_x$ and equal to or less than the width $(2\sqrt{3})/3 \times P_{cc}$ of each corner cube 702' along the y direction.

Typically, the resist pattern gap width $Dr_x$ varies in the range from $(\sqrt{3})/3 \times P_{cc}$ to $(2\sqrt{3})/3 \times P_{cc}$, along the y-direction width of the corner cubes 702' on the outer perimeter. In this case, the area of each gap as dictated by the actual resist pattern will be greater, by no less than a total area of triangles S1 and S2 of the respective corner cubes 702' in the row X, than the gap area as defined by the photomask. As shown in FIG. 16A, the triangles S1 and S2 are regions of each corner cube 702' excluding the region which is interposed between the lines Au1 and Ad1. The total area $\Delta S(x)$ of each such pair of triangles S1 and S2 is equal to $(\sqrt{3})/6 \times P_{cc}^2$. Therefore, the area of the portions of the displaying region which are not contributive to displaying (i.e., the gaps) will be increased by $(\sqrt{3})/6 \times P_{cc}^2$ or more per every corner cube in the row X, relative to the area of such portions as expected by design.

Next, with reference to FIG. 16B, the gaps extending along the y direction between pixel electrodes will be described. Herein, the photomask to be used during exposure of the resist film is designed so as to define the width of each gap extending along the y direction (hereinafter referred to as the "gap design value $Dd_y$") to be equal to or less than $P_{cc}/2$. Moreover, the photomask is placed in such a manner that each gap (as defined by the photomask) extending along the y direction is interposed between lines Al1 and Ar1, each of which extends through the bottom points 702b, vertices, and saddle points of the corner cubes 702' (the interval between the lines Al1 and Ar1 being $P_{cc}/2$).

When patterning the resist film by using the above photomask, as in the case of FIG. 16A, the resist pattern gap width $Dr_y$ will be greater than the gap design value $Dd_y$ and equal to or less than the width (i.e., pitch $P_{cc}$) of each corner cube 702' along the x direction.

Typically, the resist pattern gap width $Dr_y$ will be equal to the pitch $P_{cc}$ of the corner cubes 702'. In this case, the area of each gap as dictated by the actual resist pattern (each such gap will be present on some of the corner cubes) will be greater than the gap area as defined by the photomask, by no less than a total area of trapezoids S3 and S4 per every distance of $(\sqrt{3}) \times P_{cc}$ along the y direction. As shown in FIG. 16B, the trapezoids S3 and S4 are regions of each corner cube 702' excluding the region which is interposed between the lines Al1 and Ar1. The total area $\Delta S(y)$ of each such pair of trapezoids S3 and S4 is equal to $(\sqrt{3})/2 \times P_{cc}^2$. Therefore, the area of the portions of the displaying region which are not contributive to displaying (i.e., the gaps) will be increased by $(\sqrt{3})/2 \times P_{cc}^2$ or more per every distance of $(\sqrt{3}) \times P_{cc}$ along the y direction, relative to the area of such portions as expected by design.

On the other hand, according to the present embodiment, as has been described with reference to FIG. 8, the pixel electrodes are produced by forming a transparent conductive film on a retroreflective layer having an array of corner cubes 802', with a planarization resin layer interposed between the transparent conductive film and the retroreflective layer, and patterning the transparent conductive film. The patterning of the transparent conductive film is performed as follows. First, a resist film is formed on the transparent conductive film, and the resist film is subjected to exposure and development to achieve patterning of the resist film. At this time, irrespective of the shape or arrangement of the corner cubes 802' in the retroreflective layer, the resist film will be patterned in substantially the same pattern as defined by the photomask. Thereafter, the transparent conductive film is etched by using the resist pattern as a mask.

Therefore, as shown in FIGS. 17A and 17B, the resist pattern gap widths $Dr_x$ and $Dr_y$ associated with the resist pattern which is used during the patterning of the transparent conductive film are substantially equal to the gap design values $Dd_x$ and $Dd_y$ as defined by the photomask. Accordingly, if the gap design value $Dd_x$ is equal to or less than $(\sqrt{3})/3 \times P_{cc}$, the resist pattern gap width $Dr_x$ will also be equal to or less than $(\sqrt{3})/3 \times P_{cc}$. If the gap design value $Dd_y$ is equal to or less than $P_{cc}/2$, the resist pattern gap width $Dr_y$ will also be equal to or less than $P_{cc}/2$. Thus, according to the present embodiment, the area of the portions of the displaying region which are not contributive to displaying (i.e., the gaps) is reduced as compared to the conventional case, thus resulting in an improved aperture ratio.

Now, the relationship between the pitch $P_{pix}$ of the pixel electrodes and the pitch $P_{cc}$ of the corner cubes for obtaining an effective improvement in the aperture ratio will be discussed.

In the conventional display device, the area of the gaps between actual pixel electrodes will increase from the area of the gaps between pixel electrodes as expected by design. To be more specific, the increase in area per pixel $\Delta S = \Delta S(x) + \Delta S(y)$ will vary depending on the pitch $P_{pix}$ of the pixel electrodes and the pitch $P_{cc}$ of the corner cubes, according to eq. 1 below. Assuming that the pitch of the pixel electrodes along the x direction is $P_{pix(x)}$ and the pitch of the pixel electrodes along the y direction is $P_{pix(y)}$, it follows that:

$$\Delta S = \Delta S(x) + \Delta S(y) = \quad \text{eq. 1}$$
$$P_{pix(x)}/P_{cc} \times (S1 + S2) + P_{pix(y)}/((\sqrt{3}) \times P_{cc}) \times$$
$$(S3 + S4) = P_{pix(x)}/P_{cc} \times (\sqrt{3})/6 \times P_{cc}^2 +$$
$$P_{pix(y)}/((\sqrt{3}) \times P_{cc}) \times (\sqrt{3})/2 \times P_{cc}^2.$$
$$\text{Hence, } \Delta S = (\sqrt{3})/6 \times P_{pix(x)} \times P_{cc} + P_{pix(y)} \times P_{cc}/2$$

According to the present embodiment, a most substantial improvement in the aperture ratio over the conventional aperture ratio can be obtained in the case where the ratio of the increase in area $\Delta S$ to the pixel area $(P_{pix(x)} \times P_{pix(y)})$ is greater than 0.5%, and more preferably greater than 1%. Therefore, in order to obtain a substantial improvement in the aperture ratio, it is preferable that the pitch $P_{pix}$ of the pixel electrodes $(P_{pix(x)}$ or $P_{pix(y)})$ and the pitch $P_{cc}$ of the corner cubes satisfy eq. 2 below, and more preferably eq. 3 below. As a result, a displayed image which is brighter than a conventional displayed image can be realized.

$$\Delta S/(P_{pix(x)} \times P_{pix(y)}) = \quad \text{eq. 2}$$
$$((\sqrt{3})/6 \times P_{pix(x)} \times P_{cc} + P_{pix(y)} \times P_{cc}/2)/$$
$$(P_{pix(x)} \times P_{pix(y)}) > 0.005$$

$$\Delta S/(P_{pix(x)} \times P_{pix(y)}) = \quad \text{eq. 3}$$
$$((\sqrt{3})/6 \times P_{pix(x)} \times P_{cc} + P_{pix(y)} \times P_{cc}/2)/$$
$$(P_{pix(x)} \times P_{pix(y)}) > 0.01$$

In the case where the pitch $P_{pix(x)}$ of the pixel electrodes along the x direction is equal to the pitch $P_{pix(y)}$ of the pixel electrodes along the y direction $(P_{pix(x)} \times P_{pix(y)} = P_{pix})$, eq. 2 and eq. 3 will read as follows.

$$((\sqrt{3})+3)/6 \times P_{cc}/P_{pix} > 0.005 \quad \text{eq. 4}$$

$$((\sqrt{3})+3)/6 \times P_{cc}/P_{pix} > 0.01 \quad \text{eq. 5}$$

For instance, if the display device has a resolution of about 200 ppi (ppi: pixels per inch), a substantial improvement in the aperture ratio over the conventional aperture ratio can be obtained in the case where the pitch $P_{cc}$ of the corner cubes is equal to or greater than 1 µm. If the pitch $P_{cc}$ of the corner cubes is about 2 µm, a substantial improvement in the aperture ratio over the conventional aperture ratio can be obtained in the case where the resolution of the display device is equal to or greater than about 85 ppi.

Although rectangular-shaped pixel electrodes having sides which are parallel to the x direction and the y direction are illustrated above, the present embodiment is also applicable to the case where the directions of the longer or shorter sides of the pixel electrodes do not correspond to the x and y directions of the corner cubes, and even in that case, relationships similar to those expressed by eq. 2 and eq. 3 will be true. In other words, assuming that the pitch of the pixel electrodes along the shorter sides thereof is $P_{pix(S)}$ and the pitch of the pixel electrodes along the longer sides thereof is $P_{pix(L)}$, a substantial improvement in the aperture ratio over the conventional aperture ratio can be obtained in the case where eq. 6 below, or more preferably eq. 7 below, is satisfied.

$$((\sqrt{3})/6 \times P_{pix(L)} \times P_{cc} + P_{pix(S)} \times P_{cc}/2)/(P_{pix(L)} \times P_{pix(S)}) > 0.005 \quad \text{eq. 6}$$

$$((\sqrt{3})/6 \times P_{pix(L)} \times P_{cc} + P_{pix(S)} \times P_{cc}/2)/(P_{pix(L)} \times P_{pix(S)}) > 0.01 \quad \text{eq. 7}$$

Furthermore, according to the present embodiment, better displaying characteristics than those of a conventional retroreflection-type display device can be realized, as described in detail below.

Figure 9A:
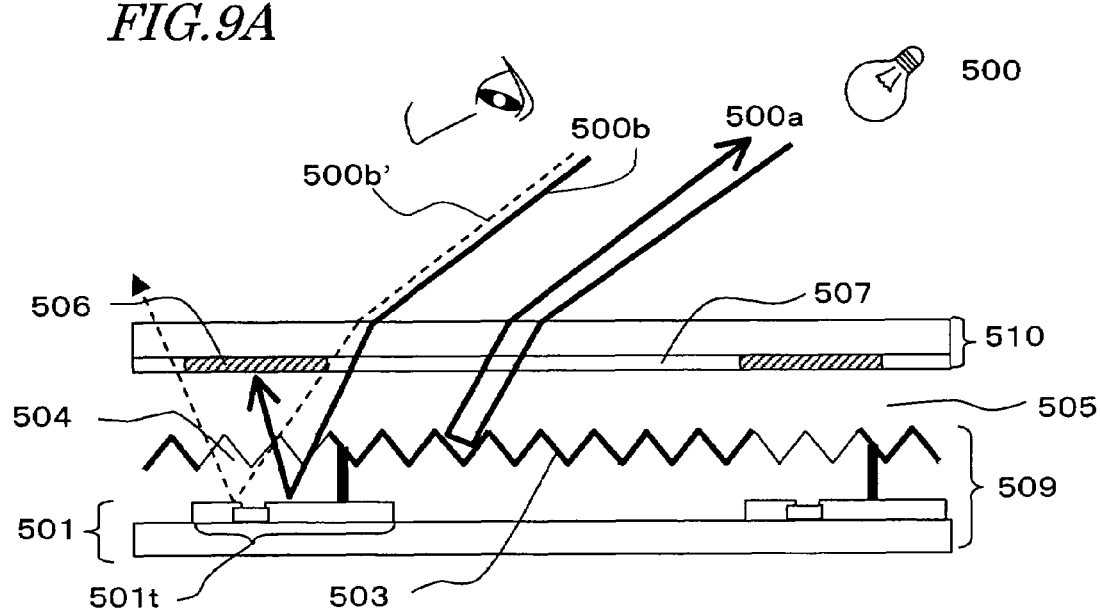
FIGS. 9A and 9B are explanatory diagrams illustrating operations of a conventional retroreflection-type LCD.
Figure 9B:
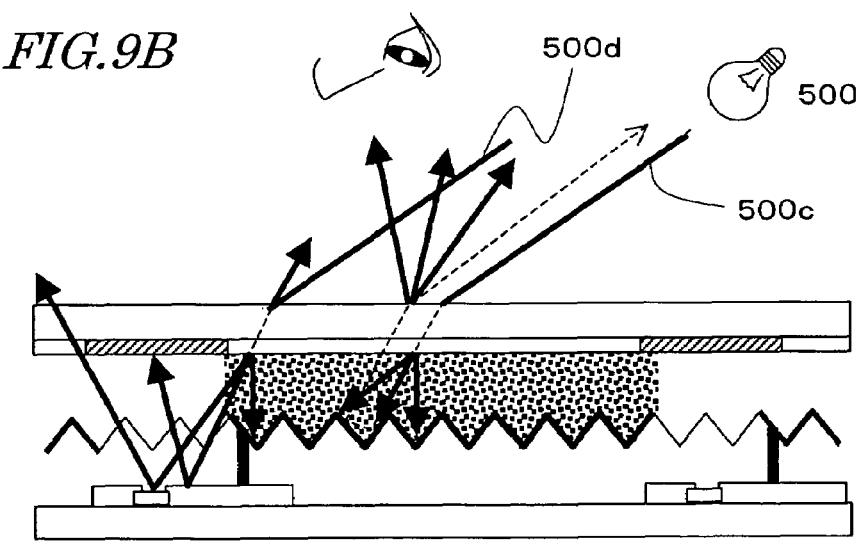
Figure 10A:
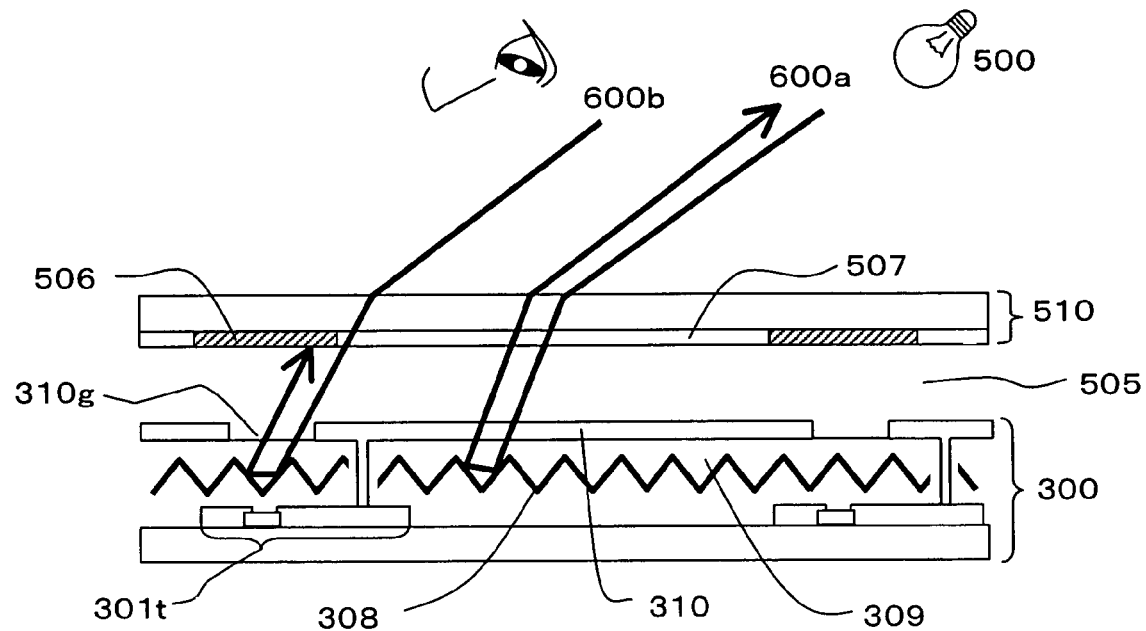
FIGS. 10A and 10B are explanatory diagrams illustrating operations of a retroreflection-type LCD according to the first embodiment of the present invention.
Figure 10B:
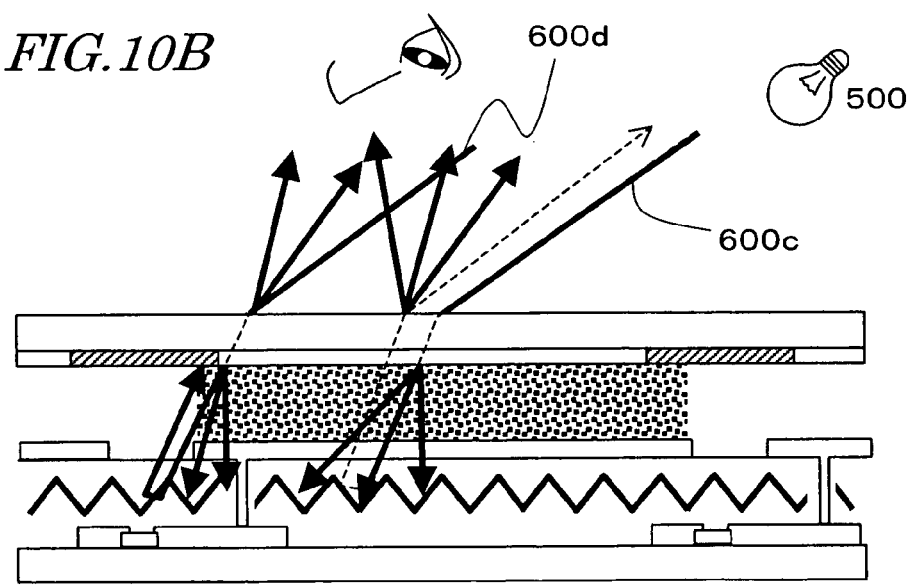

FIGS. 9A and 9B are schematic cross-sectional views showing a black state and a white state, respectively, of a conventional retroreflection-type display device. FIGS. 10A and 10B are schematic cross-sectional views showing a black state and a white state, respectively, of the retroreflection-type display device of the present embodiment. Note that both display devices are of an active matrix driving type, employing TFTs as switching elements.

The conventional retroreflection-type display device has a structure similar to that which was described above with reference to FIG. 1. In other words, the conventional retroreflection-type display device comprises a rear substrate 509, a front substrate 510, and a liquid crystal layer 505 interposed between the rear substrate 509 and the front substrate 510. The rear substrate 509 includes: a TFT substrate 501 having a plurality of thin film transistors 501t formed on its surface; and electrodes (reflection electrodes) 503 having retroreflection characteristics and being formed on the TFT substrate. The reflection electrodes 503 are spaced apart so as to correspond to the pixels. Between adjoining reflection electrodes 503, a non-reflective layer 504 which does not have a reflection function is provided. On the surface of the front substrate 510 facing the liquid crystal layer 505, color filters 507 and a black mask 506 are formed. The color filters 507 are disposed so as to correspond to the respective pixels. The black mask 506 is disposed so as to fill between adjoining color filters 507 and cover the non-reflective layer 504. Although FIGS. 9A and 9B illustrate an example where the thin film transistors 501t are disposed below the non-reflective layer 504, it may also be possible that only the wiring (source lines) of the TFT substrate 501 be disposed below the non-reflective layer 504. The liquid crystal layer 505, which is composed of e.g. PDLC, displays "black" while the liquid crystal layer 505 is in a transparent state, and displays "white" while the liquid crystal layer 505 is in a scattering state.

Now, the displaying principles of the conventional retroreflection-type LCD will be described. Firstly, the operation in a black displaying state will be described. Incident light from the light source 500 is generally reflected along a path indicated by arrow 500a in FIG. 9A. In other words, the light from the light source 500 is transmitted through a color filter 507, travels through the liquid crystal layer 505 (which is in a transparent state) so as to be reflected from the retroreflection plate 503, and again travels through the liquid crystal layer 505 and the color filter 507 to go back to the light source 500. In this case, the viewer will perceive an image of the eye(s) of the viewer himself or herself, whereby a black displaying state is obtained.

On the other hand, out of the light from the light source 500, the light (shown by arrow 500b) which obliquely enters at an edge of the color filter 507 (i.e., near the black mask 506) travels through the color filter 507 and the liquid crystal layer 505 in a transparent state, and thereafter enters the non-reflective layer 504. This light travels through the non-reflective layer 504 and reaches the surface of the thin film transistor 501t, and is reflected back therefrom. Note that, in the case where the thin film transistor 501t is not disposed below the non-reflective layer 504 but TFT substrate wiring is provided instead, the light which has been transmitted through the non-reflective layer 504 will be reflected at the surface of the wiring. The reflection from the surface of the thin film transistor 501t or the wiring is usually metallic reflection. Although depending on the particular panel design, most of the light which is reflected from the surface of the thin film transistor 501t or the like is absorbed by the black mask 506. However, in the case where the black mask 506 is designed with a small width in order to improve display brightness, for example, a portion of the light (shown by arrow 500b') which has been reflected from the surface of the thin film transistor 501t or the like may go out through a different color filter 507 from the color filter 507 which the light went through when entering the display device, thus deteriorating the black displaying characteristics.

Next, the operation in a white displaying state will be described. As shown by arrow 500c in FIG. 9B, when light from the light source 500 enters, a portion of the incident light travels through a color filter 507, and is thereafter scattered by the liquid crystal layer 505, which is in a scattering state. In the case where the liquid crystal layer (PDLC) 505 has forward scattering characteristics, the light entering the liquid crystal layer 505 is scattered toward the retroreflection plate 503 (forward scattering), and reflected from the retroreflection plate 503. The reflected light travels back through the liquid crystal layer 505 and the color filter 507, thus reaching the eye(s) of the viewer. In the case where the liquid crystal layer 505 has backward scattering characteristics, a large portion of the incident light will be scattered by the liquid crystal layer 505 so as to travel back in the viewing direction, but a portion of the incident light will still be scattered forward so as to be reflected from the retroreflection plate 503 and reach the eye(s) of the viewer. In either case, the retroreflection tendency of the light reflected from the retroreflection plate 503 is canceled by the scattering characteristics of the liquid crystal layer 505. Thus, most of the reflected light does not return toward the light source 500, but rather contributes to the white displaying state.

On the other hand, out of the light from the light source 500, the light (shown by arrow 500d) which obliquely enters at an edge of the color filter 507 (i.e., near the black mask 506) travels through the color filter 507, and is scattered by the liquid crystal layer 505. A portion of the scattered light travels through a portion of the non-reflective layer 504 which exists between adjoining reflection electrodes 503 to reach the surface of the thin film transistor 501t, thus being reflected therefrom (metallic reflection). The black mask 506 is designed so as to absorb this reflected light. However, since the light which has been scattered by the liquid crystal layer 505 is reflected from the surface of the thin film transistor 501t and further scattered by the liquid crystal layer 505, a portion of the reflected light will not be absorbed by the black mask 506, but rather will travel through a color filter 507 to go out toward the viewer. Any light which goes out through a different color filter 507 from the color filter 507 which the light went through when entering the display device will cause unwanted intermixing of colors. Note that, out of the reflected light, the amount of light which goes back through the same color filter 507 as that which the light went through when entering the display device and thus is available for displaying will be very small.

In contrast, the retroreflection-type display device of the present embodiment operates in the following manners. First, with reference to FIG. 10A, the operation in a black displaying state will be described. The retroreflection display device shown in FIG. 10A is formed by using the rear substrate 300 which has been described with reference to FIGS. 4A and 4B. The liquid crystal layer and the front substrate have similar structures to those of the liquid crystal layer 505 and the front substrate 510 of the conventional display device as described above.

Incident light from the light source 500 is generally reflected along a path indicated by arrow 600a in FIG. 10A. In other words, the light from the light source 500 is transmitted through a color filter 507, travels through the liquid crystal layer 505 (which is in a transparent state), the transparent pixel electrode 310, and the planarization resin layer 309 so as to be reflected from the retroreflection plate 308, and again travels through the planarization resin layer 309, the pixel electrode 310, the liquid crystal layer 505, and the color filter 507 to go back to the light source 500.

On the other hand, out of the light from the light source 500, the light (shown by arrow 600b) which obliquely enters at an edge of the color filter 507 (i.e., near the black mask 506) travels through the color filter 507, the liquid crystal layer 505 in a transparent state, the transparent pixel electrode 310, and the planarization resin layer 309, and thereafter is reflected from the retroreflection plate 308, so as to be absorbed by the black mask 506. However, a portion of the light reflected from the retroreflection plate 308 does not enter the black mask 506, but travels back through the color filter 507 to return toward the light source 500. Thus, the light which has traveled through an edge of a color filter 507 is either absorbed by the black mask 506, or returns toward the light source 500 via retroreflection, rather than going out in the viewing direction. As a result, good black displaying characteristics are obtained.

Next, the operation in a white displaying state will be described. As shown by arrow 600c in FIG. 10B, incident light from the light source 500 light travels through a color filter 507, and is thereafter scattered by the liquid crystal layer 505. In the case where the liquid crystal layer 505 has forward scattering characteristics, the light entering the liquid crystal layer 505 is scattered toward the retroreflection plate 308 (forward scattering), travels through the transparent pixel electrode 310 and the planarization resin layer 309, and thereafter is reflected from the retroreflection plate 308. In the case where the liquid crystal layer 505 has backward scattering characteristics, a large portion of the incident light will be scattered by the liquid crystal layer 505 so as to travel back in the viewing direction and go out through the color filter 507, although a portion of the incident light will still be scattered forward so as to be reflected from the retroreflection plate 308. In either case, the retroreflection tendency of the light reflected from the retroreflection plate 308 is canceled by the scattering characteristics of the liquid crystal layer 505. Thus, most of the light reflected from retroreflection plate 308 travels again through the color filter 507 to go out in the viewing direction. Although there is a portion of light which is scattered by the liquid crystal layer 505 toward the light source 500 and does not contribute to displaying, the amount thereof is very small.

On the other hand, out of the light from the light source 500, the light (shown by arrow 600d) which obliquely enters at an edge of the color filter 507 (i.e., near the black mask 506) travels through the color filter 507, and is scattered by the liquid crystal layer 505. Irrespective of the scattering characteristics (forward scattering or backward scattering) of the liquid crystal layer 505, a portion of the scattered light travels through the transparent pixel electrode 310 and the planarization resin layer 309, so as to be reflected from the retroreflection plate 308. Although a portion of the reflected light is absorbed by the black mask 506, the rest of the light does not enter the black mask 506, but rather travels through the same color filter 507 as that which the light went through when entering the display device, and goes out in the viewing direction. Thus, out of the light from the light source 500, the light which travels from the pixel region and passes at an edge of the color filter 507 and heading toward the black mask region also returns in the viewing direction owing to the retroreflection characteristics of the retroreflection plate 308. As a result, the efficiency of light utilization is improved so that a brighter displayed image can be obtained.

As described above, in accordance with the retroreflection-type LCD of the present embodiment, deterioration of the displaying characteristics due to light entering at an edge of the black mask 506 is suppressed. Therefore, in a black displaying state, good displaying characteristics are obtained. In a white displaying state, a brighter displayed image is obtained while suppressing unwanted intermixing of colors.

Furthermore, the present embodiment also provides the following advantages.

In the conventional reflection-type display device (FIG. 9), since the surface of the liquid crystal layer 505 facing the rear substrate has protrusions and depressions, the black displaying characteristics are deteriorated due to scattering in portions of the PDLC which are located in the depressions, even while the liquid crystal layer 505 is in a uniformly aligned state. This is because light is reflected by a plurality of faces composing each depression, thus resulting in light entering in different directions into each portion of the PDLC located in a depression, which is scattered due to the birefringence of the PDLC. Although such deterioration in the black displaying characteristics would be suppressed by providing a planarization layer between the liquid crystal layer 505 and the reflection electrodes 503, the addition of such a planarization layer would cause a voltage loss. On the other hand, according to the present embodiment, the surface of the liquid crystal layer 505 facing the rear substrate is planarized, and therefore the aforementioned scattering by the PDLC does not occur. Therefore, the black displaying characteristics can be improved and high contrast displaying can be realized. Moreover, since the pixel electrodes 308 are in contact with (i.e., electrically conducted to) the drain electrodes 306 of the thin film transistors 501*t*, there is no voltage loss associated with the planarization resin layer 309.

The structure and the method of producing the retroreflection-type LCD of the present embodiment are not limited to those described above. For example, the rear substrate 300 in the present embodiment may be produced by utilizing a columnar resist pattern (resist columns) of a shape corresponding to the contact holes. Hereinafter, a production method using resist columns will be described with reference to the drawings.

Figure 11A:
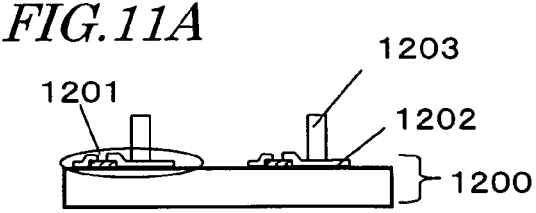
FIGS. 11A, 11B, 11C, 11D, 11E, 11F, 11G, 11H, 11I, and 11J are cross-sectional views illustrating steps of another exemplary method of producing a rear substrate in the first embodiment.

First, as shown in FIG. 11A, a resist pattern (resist columns) 1203 having a size corresponding to the size of the contact holes to be formed (e.g., with a diameter of 5 μm) are formed on drain electrodes 1202 of a TFT substrate 1200, by using a photolithography technique. The height of the resist columns 1203 is prescribed so as to be greater than the thickness of an insulating layer 1204 to be formed in a subsequent step, and is 8 μm, for example.

Figure 11B:
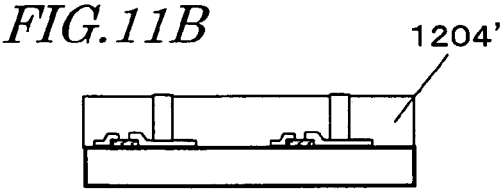

Next, as shown in FIG. 11B, a transfer resin 1204' such as an acrylic resin is applied to the TFT substrate 1200.

Figure 11C:
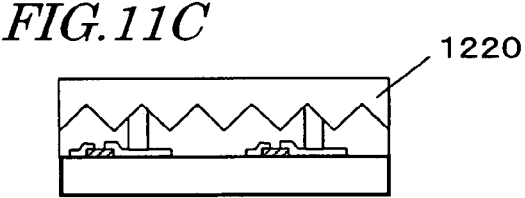

Thereafter, as shown in FIG. 11C, the surface configuration of a master 1220 is transferred to the transfer resin 1204' by an embossing technique or the like. Specifically, a master 1220 having a corner cube array on a surface thereof is attached onto the transfer resin 1204', and the transfer resin 1204' is cured. The curing of the transfer resin may be enabled based on principles such as thermoplasticity, thermosetting, or photocuring. For example, in the case where an acrylic resin is used as the transfer resin 1204', the transfer resin 1204' may be cured by being irradiated with UV. A curing accelerator may optionally be added to the transfer resin 1204.

There are no limitations as to the method and conditions for curing the transfer resin 1204'. Note however that, if curing of the resist columns 1203 should progress during the step of curing the transfer resin 1204, it will become difficult to peel the resist columns 1203 in a below-described step. For example, in the case where the resist columns 1203 are to be formed by using a positive type resist material, the transfer resin 1204' may be formed from a photocurable resin material, and cured by light irradiation. In this manner, although the resist columns 1203 will also be irradiated with light during the step of curing the transfer resin 1204', this will not promote the curing of the resist columns 1203. Alternatively, the transfer resin 1204' may be formed from a thermosetting resin material, and cured at a temperature which is lower than the full-sintering temperature for the resist columns 1203, since the resist columns 1203 will be relatively easily peeled unless fully sintered. Note that photocuring the transfer resin 1204' will provide an advantage in that the processing time is shorter than in the case of effecting the curing through thermosetting.

Figure 11D:
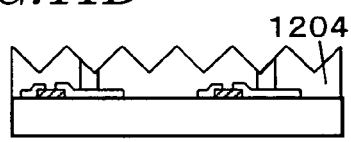
Figure 11E:
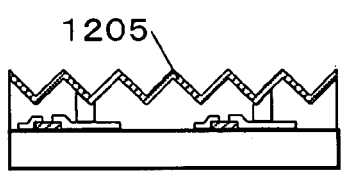

Next, the master 1220 is released from the TFT substrate 1200, whereby the insulating layer 1204 having a corner cube array is obtained, as shown in FIG. 11D. On the surface of this insulating layer 1204, as shown in FIG. 11E, a reflective metal layer (e.g. an Ag layer) 1205 is formed by a sputtering or vapor deposition technique, for example.

Figure 11F:
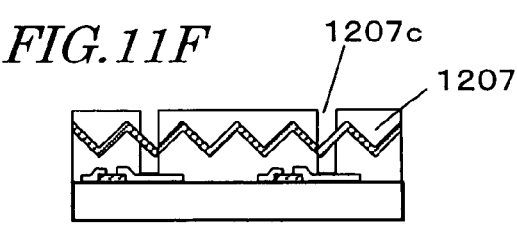

Next, as shown in FIG. 11F, a planarization resin layer 1207 is formed by applying a planarization material onto the reflective metal layer 1205, and contact holes 1207*c* are formed on the planarization resin layer 1207 by a photolithography technique. The contact holes 1207*c* must be aligned with the resist columns 1203. For example, the same mask as the mask used when forming the resist columns 1203 may be used.

Figure 11G:
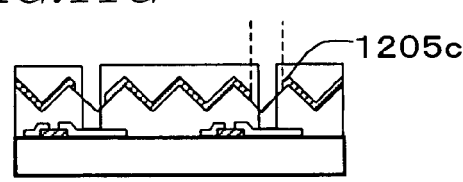

Thereafter, as shown in FIG. 11G, openings (diameter: e.g. 8 μm) 1205*c* which are greater than the contact holes 1207*c* are formed in the reflective metal layer 1205. Specifically, by using the planarization resin layer 1207 as an etching mask, a portion of the reflective metal layer 1205 is removed by wet etching, for example. At this time, the etching time, etchant, and the like are selected so that each of the portions of the reflective metal layer 1205 to be removed will be broader than the portion exposed through the corresponding contact hole 1207*c* (i.e., via overetching).

Figure 11H:
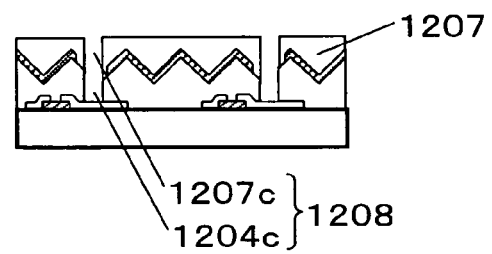

After the metal reflective layer 1205 is etched, as shown in FIG. 11H, the resist columns 1203 are detached by using a solution for dissolving the resist columns 1203 (peeling solution). As the peeling solution, an alkaline solution of an organic amine type, or a polar solvent such as acetone may be used. As a result, the contact holes 1204*c* are formed in the insulating layer 1204. Each contact hole 1204*c* is connected to the corresponding contact hole 1207*c* formed in the planarization resin layer 1207, thus resulting in a single contact hole 1208 which penetrates through the insulating layer 1204 and the planarization resin layer 1207 and reaches the corresponding drain electrode 1202.

Alternatively, by using a solution which is prepared so as to be able to dissolve the resist columns 1203 and be used as an etchant for the reflective metal layer 1205, the step of overetching the reflective metal layer 1205 (shown in FIG. 11G) and the step of removing the resist columns (shown in FIG. 11H) can be simultaneously performed.

Figure 11I:
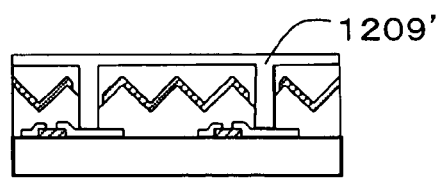
Figure 11J:
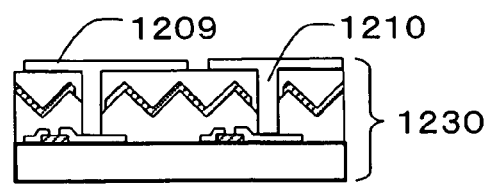

Thereafter, as shown in FIG. 11I, an application-type ITO is applied to the planarization resin layer 1207 and the inside of the contact holes 1208, thus forming an ITO film 1209'. Next, as shown in FIG. 11J, the ITO film 1209' is patterned into pixel electrodes 1209. Each pixel electrode 1209 is electrically connected to the drain electrode 1202 of the corresponding thin film transistor via a contact portion 1210 which is formed within the contact hole 1208. Thus, the rear substrate 1230 is completed.

Although a retroreflective layer having a corner cube array is formed as the reflective metal layer 1205 in the above example, a similar method may be used to form a retroreflective layer of any other configuration, or form a diffuse reflection layer.

Instead of the resist columns 1203, conductive columns may be formed from a conductive material. In this case, in the completed rear substrate, each conductive column will constitute a part of the contact portion connecting between the pixel electrode and the switching element. Hereinafter, a method for producing a rear substrate in the case of forming conductive columns (conductive portions) will be described.

Figure 12A:
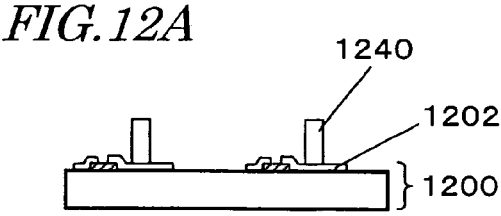
FIGS. 12A, 12B, 12C, 12D, 12E, 12F, 12G, 12H, and 12I are cross-sectional views illustrating steps of still another exemplary method of producing a rear substrate in the first embodiment.
Figure 12B:
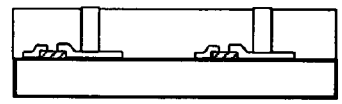
Figure 12C:
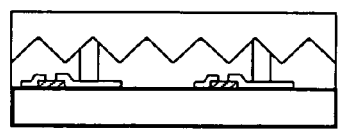
Figure 12D:
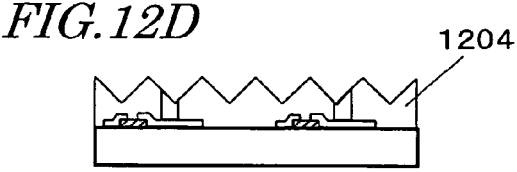
Figure 12E:
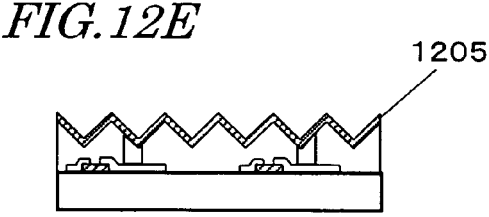
Figure 12F:
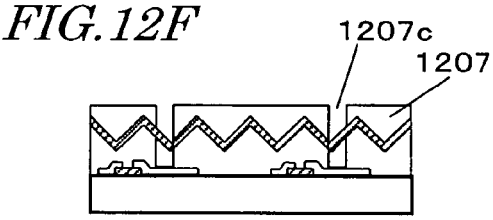
Figure 12G:
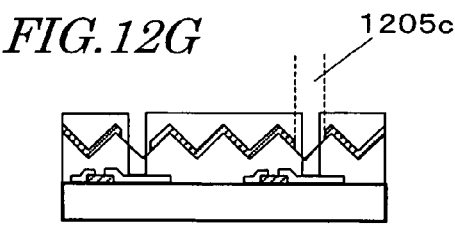

First, as shown in FIG. 12A, columnar conductive portions 1240 are formed upon drain electrodes 1202 on a TFT substrate 1200. The conductive portions 1240 may be formed by, for example, depositing and then patterning a conductive material. The size and thickness of the conductive portions 1240 may be the same as those of the above-described resist columns 1203.

As the conductive material, a conductive material-dispersed resin obtained by dispersing a conductive material (e.g., carbon, aluminum) in an insulative resin (e.g., acrylic resin), or an organic conductive compound (e.g., polyacetylene) whose polymer component in itself has conductivity may be used. By using a conductive material-dispersed resin which contains a photocurable acrylic resin or the like as an insulative resin, it becomes possible to perform patterning by a photolithography technique, whereby the step of forming the conductive portions 1240 can be simplified.

Next, as has been described with reference to FIGS. 11B to 11G, an insulating layer 1204 is formed by an embossing technique, and thereafter a metal reflective layer 1205 having openings 1205c and a planarization resin layer 1207 having contact holes 1207c are formed (FIGS. 12B to 12G).

Figure 12H:
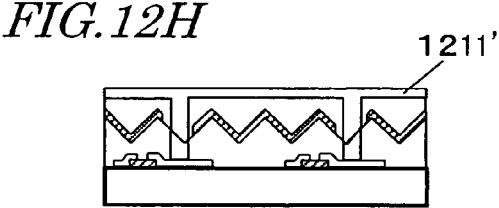
Figure 12I:
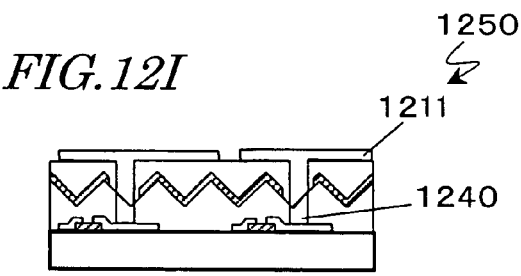

Thereafter, as shown in FIG. 12H, an application-type ITO is applied to the planarization resin layer 1207 and the inside of the contact holes 1207c so as to form an ITO film 1211'. Next, as shown in FIG. 12I, the ITO film 1211' is patterned into pixel electrodes 1211. Each pixel electrode 1211 is electrically connected to the drain electrode 1202 of the corresponding thin film transistor, via a contact portion which is composed of the ITO film which is formed inside the contact hole 1207c and the conductive portion 1240. Thus, the rear substrate 1250 is completed.

Second Embodiment

Hereinafter, a reflection-type display device according to a second embodiment of the present invention will be described.

Figure 13A:
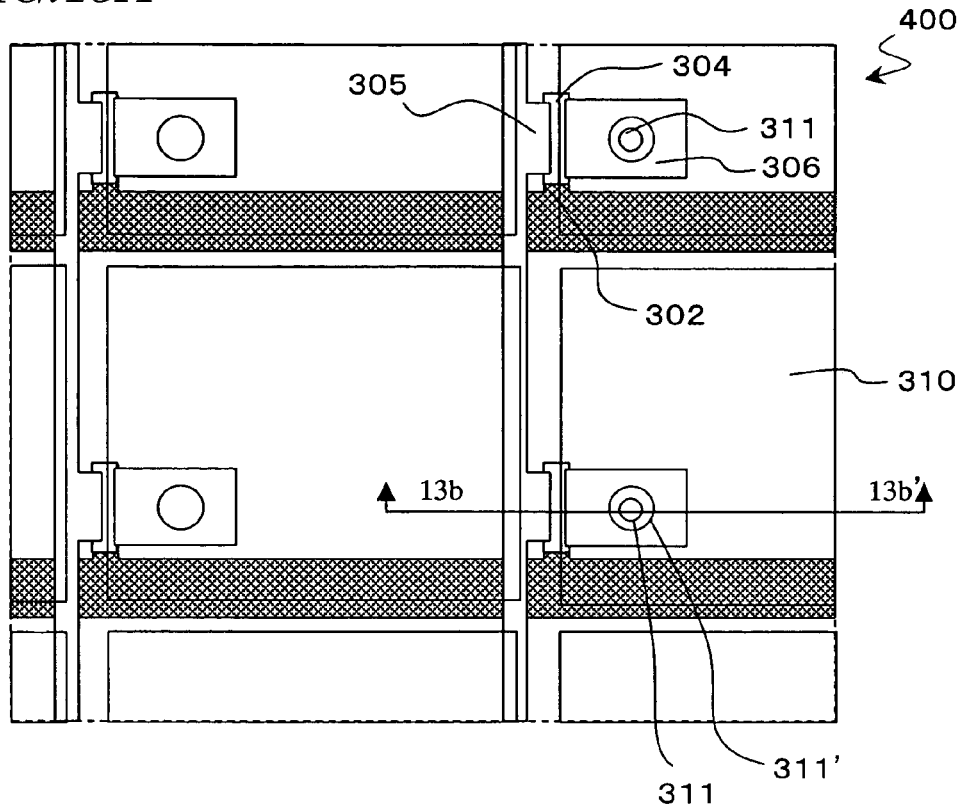
FIGS. 13A and 13B are a plan view and a cross-sectional view (taken along line 13b-13b' in FIG. 13A) respectively, showing the structure of a rear substrate in a second embodiment of the present invention.
Figure 13B:
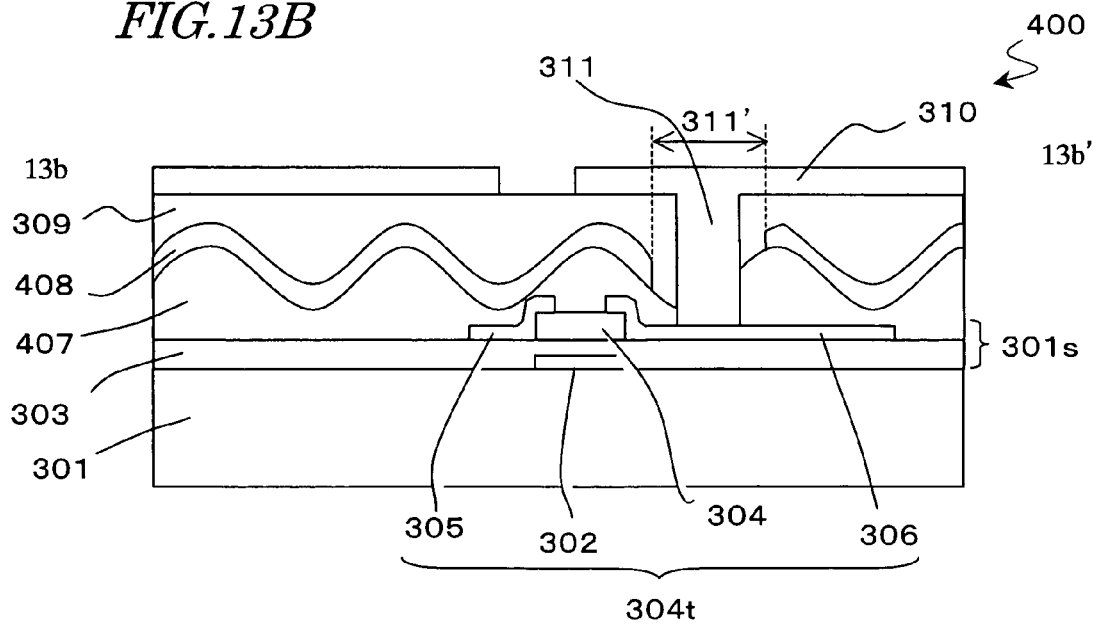

FIG. 13A is a plan view showing the structure of a rear substrate (TFT-side substrate) 400 in the reflection-type LCD of the present embodiment. FIG. 13B is a cross-sectional view taken along line 13b-13b' in the plan view of FIG. 13A.

The rear substrate 400 has a similar structure to that of the rear substrate 300 which has been described with reference to FIGS. 4A and 4B. However, the rear substrate 400 differs from the rear substrate 300 in that the insulating layer 407 has a diffuse reflection configuration rather than a retroreflective configuration, and the reflective layer 408 has scatter reflection characteristics rather than retroreflection characteristics.

The rear substrate 400 of the present embodiment can be formed by a method described below, for example.

First, a TFT substrate is formed by using a method similar to that which was described with reference to FIGS. 5A and 6A. Next, on the TFT substrate, a resin layer of a random pattern is formed by using an acryl type UV-curable resin, for example. The random pattern may be a pattern composed of a plurality of islet portions (each islet portion being sized, e.g., 10 μm×10 μm). Next, the resin layer is heated to 105° C., for example, to cause thermal deformation (thermal flow) of the resin layer, whereby an insulating layer 407 having protrusions and depressions on its surface is formed.

Then, by using a method similar to that which was described with reference to FIGS. 5B and 6B, contact holes 311 are formed in the insulating layer 407, and thereafter a reflective metal layer (an Ag layer) is formed on the insulating layer 407. In this reflective metal layer, openings 311' having a diameter than that of the contact holes 311 are formed. Thus, the reflective layer 408 having diffuse reflection characteristics is formed.

Thereafter, by using a method similar to that which was described with reference to FIGS. 5C and 6C, the planarization resin layer 309 and the pixel electrodes 310 are formed, whereby the rear substrate 400 is obtained.

By using the rear substrate 400 which has been obtained as described above, the reflection-type LCD of the present embodiment can be produced through processes similar to those used for producing a conventional reflection-type LCD. A specific method will be described below.

First, a polyimide film is formed on the rear substrate 400, and the polyimide film is rubbed with a cloth to form an alignment layer for controlling the directions of liquid crystal molecules. On the other hand, a front substrate having a color filter layer, a transparent conductive film, and an alignment layer thereon is formed. The alignment layer of the front substrate can also be formed by a method similar to the method for forming the alignment layer of the rear substrate 400. Next, the rear substrate 400 and the front substrate are attached together, and a liquid crystal layer (of e.g., a birefringence mode) is formed therebetween. Unlike in the retroreflection-type LCD of the first embodiment, a polarizing plate and a phase difference plate corresponding to the phase difference associated with the liquid crystal layer are attached to a surface of the front substrate. Thus, the reflection-type LCD of the present embodiment is completed.

The method for producing the rear substrate 400 and the display device of the present embodiment are not limited to the above-described method. For example, the rear substrate 400 may be produced by a method utilizing resist columns which has been described with reference to FIGS. 11A to 11J, and a method utilizing columnar conductive portions which has been described with reference to FIGS. 12A to 12I.

Figure 14A:
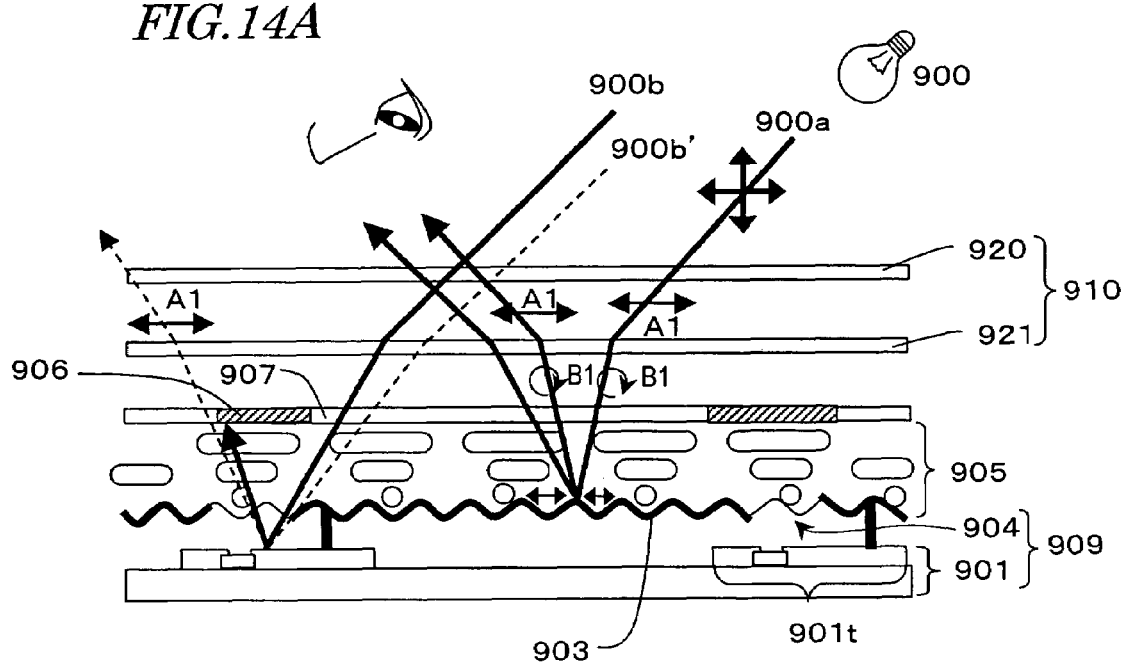
FIGS. 14A and 14B are explanatory diagrams illustrating operations of a conventional diffuse reflection-type LCD.
Figure 14B:
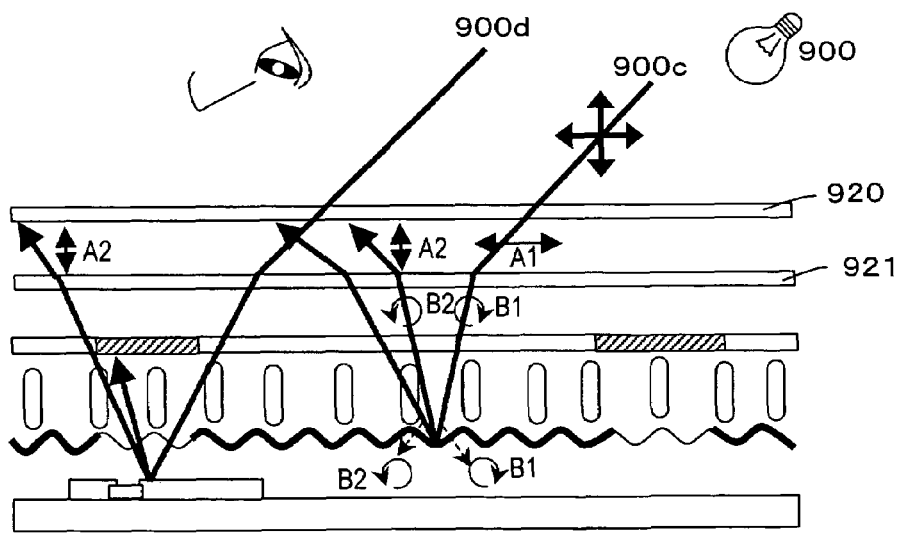
Figure 15A:
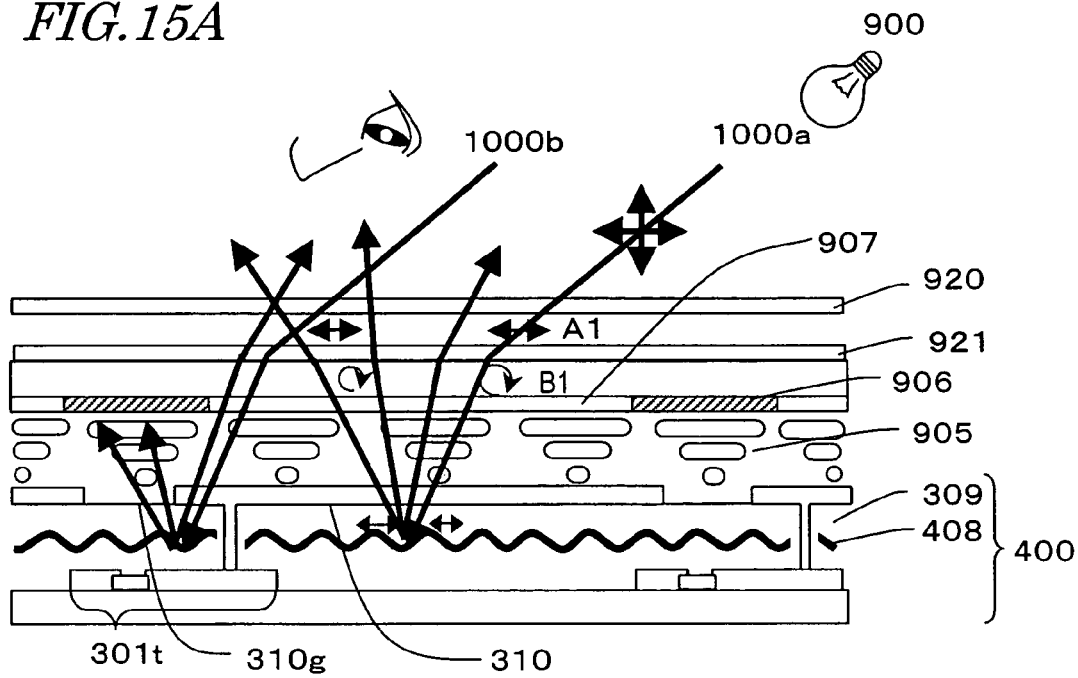
FIGS. 15A and 15B are explanatory diagrams illustrating operations of a diffuse reflection-type LCD according to the second embodiment of the present invention.
Figure 15B:
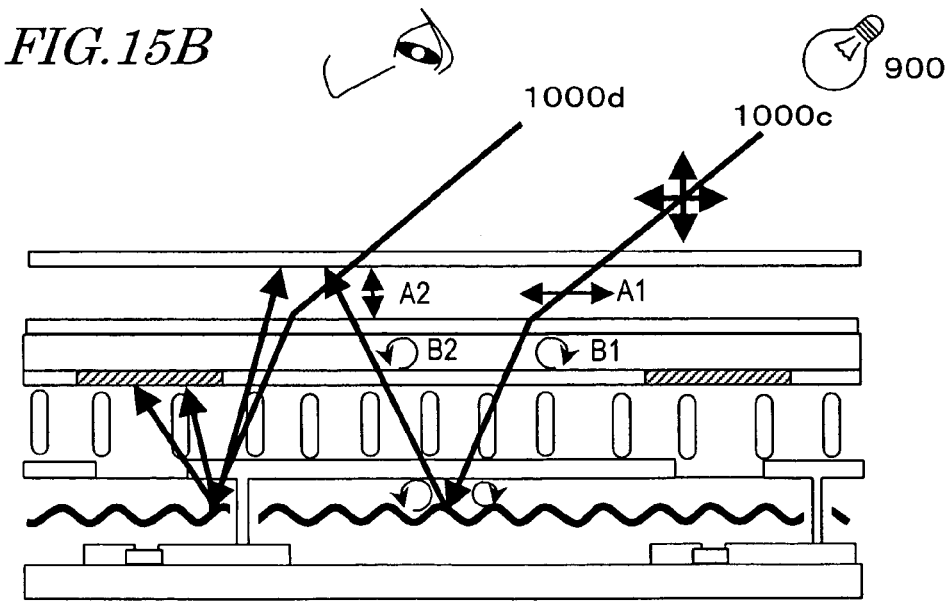

Hereinafter, with reference to the drawings, the advantages of the diffuse reflection-type LCD of the present embodiment over the conventional diffuse reflection-type display device will be described. FIGS. 14A and 14B are schematic cross-sectional views showing a white state and a black state, respectively, of a conventional diffuse reflection-type LCD. FIGS. 15A and 15B are schematic cross-sectional views showing a white state and a black state, respectively, of the diffuse reflection-type LCD of the present embodiment. Note that both display devices are of an active matrix driving type, employing TFTs as switching elements. As one exemplary display mode, a single-polarizing plate mode utilizing a polarizing plate, a phase difference plate, a liquid crystal layer, and a reflective layer is adopted. In the following example, a liquid crystal layer of an electrically controlled birefringence mode which is designed so as to take a "white" displaying state in the absence of an applied voltage is used.

Alternatively, the liquid crystal layer may be designed so as to take a "black" displaying state in the absence of an applied voltage.

The conventional diffuse reflection-type LCD comprises a rear substrate 909, a front substrate 910, and a liquid crystal layer 905 interposed between the rear substrate 909 and the front substrate 910. The rear substrate 909 includes: a TFT substrate 901 having a plurality of thin film transistors 901*t* formed on its surface; and electrodes (reflection electrodes) 903 having diffuse reflection characteristics and being formed on the TFT substrate 901. The reflection electrodes 903 are disposed so as to correspond to the pixels. Between adjoining reflection electrodes 903, a non-reflective layer 904 is provided. On the surface of the front substrate 910 facing the liquid crystal layer 905, color filters 907 and a black mask 906 are formed. The color filters 907 are disposed so as to correspond to the respective pixels. The black mask 906 is disposed so as to fill between adjoining color filters 907 and cover the non-reflective layer 904. On the surface of the front substrate 910 facing toward the viewer, a phase difference plate 921 and a polarizing plate 920 are disposed in this order.

Now, the displaying principles of the conventional diffuse reflection-type LCD will be described. Firstly, the operation in a white displaying state will be described. Incident light from the light source 900 is generally reflected along a path indicated by arrow 900*a* in FIG. 14A. The light from the light source 900 is led through the polarizing plate 920 so as to be converted into linearly-polarized light A1 which is parallel to the direction of the transmission axis of the polarizing plate 920, and thereafter is led through the phase difference plate 921 so as to be converted into clockwise circularly-polarized light B1. The circularly-polarized light B1 travels through a color filter 907, and then through the liquid crystal layer (retardation $\Delta nd = \lambda/4$) 905 so as to become linearly-polarized light A1, and is reflected from the diffuse reflection plate 903. The reflected light again travels through the liquid crystal layer 905 to become circularly-polarized light B1, and after traveling through the color filter 907, is converted by the phase difference plate 921 into linearly-polarized light A1, thus going out from the polarizing plate 920 in the viewing direction.

On the other hand, out of the light from the light source 900, the light (shown by arrow 900*b*) which obliquely enters at an edge of the color filter 907 (i.e., near the black mask 906) travels through the liquid crystal layer 905, and thereafter enters the non-reflective layer 904 between adjoining reflection electrodes 903. This light travels through the non-reflective layer 904 and reaches the surface of the thin film transistor 901*t*, and is reflected back therefrom. The reflection from the surface of the thin film transistor 901*t* is usually metallic reflection. Although depending on the particular panel design, most of the light which is reflected from the surface of the thin film transistor 901*t* is absorbed by the black mask 906. However, since the distance between the color filter 907 and the surface (reflection surface) of the thin film transistor 901*t* is longer than the distance between the color filter 907 and the diffuse reflection plate 903, a portion of the light (shown by arrow 900*b'*) which has been reflected from the surface of the thin film transistor 901*t* may go out through a different color filter 907 from the color filter 907 which the light went through when entering the display device. This light going out through a different color filter 907 from the color filter 907 which the light went through when entering the display device is converted by the phase difference plate 921 into linearly-polarized light A1, and travels through the polarizing plate 920 to return in the viewing direction, thus causing unwanted intermixing of colors.

Next, the operation in a black displaying state will be described. As shown by arrow 900*c* in FIG. 14B, the light from the light source 900 is led through the polarizing plate 920 to be converted into linearly-polarized light A1 which is parallel to the direction of the transmission axis of the polarizing plate 920, and thereafter is led through the phase difference plate 921 to become clockwise circularly-polarized light B1, for example. The circularly-polarized light B1 travels through a color filter 907 and then through the liquid crystal layer 905. If a predetermined voltage (saturation voltage or higher) is being applied to the liquid crystal layer 905, the retardation $\Delta nd$ of the liquid crystal layer 905 is substantially zero. Therefore, the polarization state of the light traveling through the liquid crystal layer 905 is conserved. In this case, the circularly-polarized light B1 which has been led through the liquid crystal layer 905 is reflected by the diffuse reflection plate 903 to become counterclockwise circularly-polarized light B2, and again travels through the liquid crystal layer 905 and the color filter 907. The light (circularly-polarized light B2) which has traveled through the color filter 907 goes through the phase difference plate 921, so as to become linearly-polarized light A2 which is perpendicular to the linearly-polarized light A1. Since the linearly-polarized light A2 is perpendicular to the direction of the transmission axis of the polarizing plate 920 and thus is absorbed by the polarizing plate 920, a black state is obtained.

On the other hand, out of the light from the light source 900, the light (shown by arrow 900*d*) which obliquely enters at an edge of the color filter 907 (i.e., near the black mask 906) travels through the liquid crystal layer 905, and thereafter enters the non-reflective layer 904. This light travels through the non-reflective layer 904 and reaches the surface of the thin film transistor 901*t*, and is reflected back therefrom. The reflection from the surface of the thin film transistor 901*t* is usually metallic reflection. Although depending on the particular panel design, most of the light which is reflected from the surface of the thin film transistor 901*t* is absorbed by the black mask 906. A portion of the light reflected from the surface of the thin film transistor 901*t* which is not absorbed by the black mask 906 but travels through a different color filter 907 from the color filter 907 which the light went through when entering the display device is absorbed by the polarizing plate 920, so that the black displaying state is not degraded.

By varying the voltage applied across the liquid crystal layer 905 in a range from zero to the saturation voltage, gray scale displaying can be realized. If the applied voltage is zero, the retardation $\Delta nd$ of the liquid crystal layer 905 is $\lambda/4$, so that the light which has been led through the liquid crystal layer 905 after being reflected from the diffuse reflection plate 903 is clockwise circularly-polarized light B1. If a voltage which is smaller than the saturation voltage is applied across the liquid crystal layer 905, the light which has been led through the liquid crystal layer 905 after being reflected from the diffuse reflection plate 903 is elliptically-polarized light. Since a portion of the elliptically-polarized light does not go through the polarizing plate 920, a gray scale tone is displayed. As a greater voltage is applied across the liquid crystal layer 905, the retardation $\Delta nd$ of the liquid crystal layer 905 becomes smaller, and the light going out from the polarizing plate 920 accounts for a greater proportion within the reflected light from the diffuse reflection plate 903, thus approaching a black displaying state.

Next, with reference to FIGS. 15A and 15B, the operation of the diffuse reflection-type LCD of the present embodiment will be described. The diffuse reflection display device shown in FIGS. 15A and 15B is formed by using the rear substrate 400 which has been described with reference to FIGS. 13A and 13B. The structures of the liquid crystal layer and the front substrate are similar to those of the liquid crystal layer 905 and the front substrate 910 of the above-described conventional display device.

Firstly, the operation in a white displaying state will be described. Incident light from the light source 900 is generally reflected along a path indicated by arrow 1000a in FIG. 15A. The light from the light source 900 is led through the polarizing plate 920 so as to be converted into linearly-polarized light A1 which is parallel to the direction of the transmission axis of the polarizing plate 920, and thereafter is led through the phase difference plate 921 so as to be converted into clockwise circularly-polarized light B1, for example. The circularly-polarized light B1 travels through a color filter 907, and then through the liquid crystal layer (retardation $\Delta nd=\lambda/4$) 905 so as to become linearly-polarized light A1, goes through the planarization resin layer 309, and is reflected from the diffuse reflection plate 408. The reflected light travels through the planarization resin layer 309 and the liquid crystal layer 905 to become circularly-polarized light B1, and after traveling through the color filter 907, is converted by the phase difference plate 921 into linearly-polarized light A1. Thus, the reflected light (linearly-polarized light A1) travels through the polarizing plate 920 to go out in the viewing direction.

On the other hand, out of the light from the light source 900, the light which obliquely enters at an edge of the color filter 907 (i.e., near the black mask 906) travels through the liquid crystal layer 905 and the planarization resin layer 309, along a path similar to the path shown by arrow 1000a, and thereafter is reflected by the diffuse reflection plate 408. However, most of the reflected light is absorbed by the black mask 906 (arrow 1000b). Note that the proportion of the reflected light which is not absorbed by the black mask 906 but travels through a different color filter 907 from the color filter 907 which the light went through when entering the display device is much smaller than in the conventional display device (FIG. 14A). This is because, in the present embodiment, the distance between the black mask 906 and the reflection surface (surface of the diffuse reflection plate 408) is equal to the distance between the color filter 907 and the reflection surface, so that the expanse of the reflected light is reduced, thus reducing the proportion of the reflected light which travels through a different color filter 907 from the color filter 907 which the light went through when entering the display device. Therefore, unwanted intermixing of colors, which is a problem with the conventional display device, is suppressed.

Next, the operation in a black displaying state will be described. As shown by arrow 1000c in FIG. 15B, the light from the light source 900 is led through the polarizing plate 920 to be converted into linearly-polarized light A1 which is parallel to the direction of the transmission axis of the polarizing plate 920, and thereafter is led through the phase difference plate 921 to become clockwise circularly-polarized light B1, for example. The circularly-polarized light B1 travels through a color filter 907 and then through the liquid crystal layer 905. If a predetermined voltage (saturation voltage or higher) is being applied to the liquid crystal layer 905, the retardation $\Delta nd$ of the liquid crystal layer 905 is substantially zero. Therefore, the polarization state of the light traveling through the liquid crystal layer 905 is conserved. In this case, the circularly-polarized light B1 which has been led through the liquid crystal layer 905 travels through the planarization resin layer 309, and is reflected by the diffuse reflection plate 408 to become counterclockwise circularly-polarized light B2, and again travels through the planarization resin layer 309, the liquid crystal layer 905, and the color filter 907. The light (circularly-polarized light B2) which has traveled through the color filter 907 goes through the phase difference plate 921, so as to become linearly-polarized light A2 which is perpendicular to the linearly-polarized light A1. Since the linearly-polarized light A2 is absorbed by the polarizing plate 920, a black state is obtained.

On the other hand, out of the light from the light source 900, the light which obliquely enters at an edge of the color filter 907 (i.e., near the black mask 906) travels through the liquid crystal layer 905 and the planarization resin layer 309, along a path similar to the path shown by arrow 1000c, and thereafter is reflected by the diffuse reflection plate 408. However, most of the reflected light is absorbed by the black mask 906. A portion of the light reflected from the diffuse reflection plate 408 which is not absorbed by the black mask 906 but travels through a color filter 907 is absorbed by the polarizing plate 920, so that the black displaying state is not degraded.

As described above, in accordance with the diffuse reflection-type LCD of the present embodiment, deterioration of the displaying characteristics due to light entering at an edge of the black mask 906 is suppressed. Therefore, in a black displaying state, good displaying characteristics are obtained. In a white displaying state, a brighter displayed image is obtained while suppressing unwanted intermixing of colors.

Furthermore, the present embodiment also provides the following advantages.

Generally speaking, in a diffuse reflection-type LCD, the liquid crystal molecules in the liquid crystal layer 905 are aligned in the direction of an electric field in a black state (i.e., under an applied voltage in this example). As a result, the anisotropy of refractive index of the liquid crystal layer 905 is reduced, and ideally the phase difference (retardation $\Delta nd$) would become zero. In practice, though, a layer ("anchoring layer") which is present on the surface of the liquid crystal layer 905, whose alignment state does not change in spite of changes in the applied voltage, prevents the retardation $\Delta nd$ of the liquid crystal layer 905 from being reduced to zero. However, the retardation $\Delta nd$ of the liquid crystal layer 905 can be minimized by reducing the thickness of the anchoring layer.

In the conventional display device shown in FIGS. 14A and 14B, an alignment film (not shown) is typically formed on the reflection electrodes 903 having protrusions and depressions, and the liquid crystal layer 905 is formed on the alignment film. The alignment film has a surface configuration which corresponds to the configuration of the reflection electrodes 903. If the liquid crystal layer 905 is provided on a surface having protrusions and depressions, the orientation directions of the liquid crystal molecules are likely to become non-uniform in the neighborhood of the protrusions and depressions. This results in an increased apparent thickness of a layer of liquid crystal molecules which are not aligned in the direction of the electric field even under an applied voltage. Consequently, the retardation And (phase difference) of the liquid crystal layer 905 cannot be reduced sufficiently, making it different to obtain good black (dark) characteristics.

On the other hand, according to the present embodiment, an alignment film is formed on the planarization resin layer 309, and the alignment surface which is in contact with the liquid crystal layer 905 is flat. Thus, the surface layer of the liquid crystal layer 905 can be made thinner than the surface layer of a conventional display device, whereby a substantial improvement in the black displaying characteristics can be obtained.

According to the present invention, there is provided a reflection-type LCD which realizes an improved aperture ratio and an improved efficiency of light utilization while maintaining a stable alignment in the liquid crystal. Since the reflection-type LCD of the present invention has high displaying characteristics, displayed images with a higher quality than conventionally can be realized.

The present invention is suitably used for a retroreflection-type LCD comprising a reflective layer having retroreflection characteristics.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC § 119 (a) on Patent Application No. 2004-171530 filed in Japan on Jun. 9, 2004, the entire contents of which are hereby incorporated by reference.

What is claimed is:

1. A reflection-type display device comprising:
    an active switch layer including a plurality of switching elements;
    a plurality of pixel electrodes each connected to a corresponding one of the plurality of switching elements;
    a reflective layer formed between the active switch layer and the plurality of pixel electrodes;
    a modulation layer provided at a side of the pixel electrodes facing a viewer, the modulation layer being capable of switching between a first state and a second state of respectively different optical characteristics,
    wherein the reflective layer is connected to neither the plurality of switching elements nor the plurality of pixel electrodes, and wherein the reflective layer has retroreflection characteristics and includes a two-dimensional array of a plurality of unit features comprising cubic corner cubes; and
    wherein each pixel electrode has a substantially rectangular planar shape, and the relationships $$Dr_{(S)} <= (\sqrt{3}/3) \times P_{cc}$$

$$Dr_{(L)} <= (\sqrt{3}/3) \times P_{cc}$$

$$((\sqrt{3}/6 \times P_{pix(L)} \times P_{cc} + P_{pix(S)} \times P_{cc}/2)/(P_{pix(L)} \times P_{pix(S)})) > 0.005$$

are satisfied, where $Dr_{(S)}$ is a gap width between the pixel electrodes along a direction S of shorter sides thereof, $Dr_{(L)}$ is a gap width between the pixel electrodes along a direction L of longer sides thereof, $P_{cc}$ is a pitch of the cubic corner cubes: $P_{pix(S)}$ is a pitch of the pixel electrodes along the direction S; and $P_{pix(L)}$ is a pitch of the pixel electrodes along the direction L.

2. The reflection-type display device of claim 1, wherein the reflective layer is present below gaps between adjoining pixel electrodes.

3. The reflection-type display device of claim 1, wherein the reflective layer is not divided into portions corresponding to pixels.

4. The reflection-type display device of claim 1, wherein the reflective layer has a plurality of openings, and each of the plurality of pixel electrodes is connected to the corresponding switching element via a corresponding one of the plurality of openings in the reflective layer.

5. The reflection-type display device of claim 1, further comprising a plurality of contact portions for respectively connecting the plurality of pixel electrodes with the corresponding switching elements, each of the plurality of contact portions being provided via a corresponding one of the plurality of openings in the reflective layer, wherein each contact portion has a diameter which is smaller than a diameter of each opening.

6. The reflection-type display device of claim 1, wherein the gaps between adjoining pixel electrodes are not aligned with the unit features of the reflective layer.

7. The reflection-type display device of claim 1, wherein each pixel electrode has a substantially rectangular planar shape, and the relationship $$((\sqrt{3}/6 \times P_{pix(L)} \times P_{cc} + P_{pix(S)} \times P_{cc}/2)/(P_{pix(L)} \times P_{pix(S)})) > 0.01$$

is satisfied.

8. The reflection-type display device of claim 1, wherein the relationship $$((\sqrt{3})+3)/6 \times P_{cc}/P_{pix} > 0.005$$

is satisfied.

9. The reflection-type display device of claim 1, wherein the relationship $$((\sqrt{3})+3)/6 \times P_{cc}/P_{pix} > 0.01$$

is satisfied.

10. The reflection-type display device of claim 1, wherein the modulation layer is capable of switching between a light scattering state and a light transmitting state.

11. A method for producing a reflection-type display device, the method comprising:
    providing a substrate having an active switch layer formed thereon, the active switch layer including a plurality of switching elements;
    forming an insulating layer on the active switch layer;
    forming a reflective layer on the insulating layer, the reflective layer having a plurality of openings, and wherein the reflective layer has retroreflection characteristics and includes a two-dimensional array of a plurality of unit features comprising cubic corner cubes;
    forming a planarization resin layer on the reflective layer;
    forming a plurality of pixel electrodes on the planarization resin layer, each of the plurality of pixel electrodes being connected to a corresponding one of the plurality of switching elements; and
    providing a modulation layer on the plurality of pixel electrodes, the modulation layer being capable of switching between a first state and a second state of respectively different optical characteristics,
    wherein each of the plurality of pixel electrodes is connected to the corresponding switching element via a corresponding one of the plurality of openings in the reflective layer; and
    wherein each pixel electrode has a substantially rectangular planar shape, and the relationships $$Dr_{(S)} >= (\sqrt{3}/3) \times P_{cc}$$

$$Dr_{(L)} >= (\sqrt{3}/3) \times P_{cc}$$

$$((\sqrt{3}/6 \times P_{pix(L)} \times P_{cc} + P_{pix(S)} \times P_{cc}/2)/(P_{pix(L)} \times P_{pix(S)})) > 0.005$$

are satisfied, where $Dr_{(S)}$ is a gap width between the pixel electrodes along a direction S of shorter sides thereof. $Dr_{(L)}$ is a gap width between the pixel electrodes along a direction L of longer sides thereof, $P_{cc}$ is a pitch of the cubic corner cubes; $P_{pix(S)}$ is a pitch of the pixel electrodes along the direction S; and $P_{pix(L)}$ is a pitch of the pixel electrodes along the direction L.

12. The device of claim 1, wherein the reflective layer is electrically floating.

13. The method of claim 11, wherein the reflective layer is electrically floating.

* * * * *